United States Patent
Dudebout et al.

(10) Patent No.: US 11,549,437 B2
(45) Date of Patent: Jan. 10, 2023

(54) COMBUSTOR FOR GAS TURBINE ENGINE AND METHOD OF MANUFACTURE

(71) Applicant: HONEYWELL INTERNATIONAL INC., Charlotte, NC (US)

(72) Inventors: Rodolphe Dudebout, Phoenix, AZ (US); Hamdullah Ozogul, Phoenix, AZ (US); Atul Verma, Phoenix, AZ (US); Amy Kujala, Phoenix, AZ (US); Michael Wedig, Phoenix, AZ (US); Ryan Meyer, Phoenix, AZ (US); Bradley Culbertson, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/178,418

(22) Filed: Feb. 18, 2021

(65) Prior Publication Data

US 2022/0260016 A1 Aug. 18, 2022

(51) Int. Cl.
*F02C 7/12* (2006.01)
*F23R 3/00* (2006.01)

(52) U.S. Cl.
CPC ............... *F02C 7/12* (2013.01); *F23R 3/002* (2013.01); *F05D 2220/32* (2013.01); *F05D 2230/232* (2013.01); *F05D 2230/31* (2013.01); *F05D 2240/35* (2013.01); *F23R 2900/00018* (2013.01)

(58) Field of Classification Search
CPC .... F02C 7/12; F23R 3/002; F23R 3/52; F23R 3/54; F23R 2900/00018; F05D 2220/32; F05D 2230/232; F05D 2230/31; F05D 2240/35
See application file for complete search history.

(56) References Cited

U.S. PATENT DOCUMENTS

| | | | | | |
|---|---|---|---|---|---|
| 4,549,402 | A | * | 10/1985 | Saintsbury ................ | F23R 3/32 60/738 |
| 6,079,199 | A | * | 6/2000 | McCaldon ................ | F23R 3/54 60/757 |
| 7,269,958 | B2 | * | 9/2007 | Stastny ..................... | F23R 3/54 60/754 |
| 7,628,020 | B2 | * | 12/2009 | Alkabie .................... | F23R 3/50 60/804 |
| 8,001,793 | B2 | * | 8/2011 | Patel ........................ | F23R 3/06 60/754 |

(Continued)

*Primary Examiner* — Ehud Gartenberg
*Assistant Examiner* — Henry Ng
(74) *Attorney, Agent, or Firm* — Lorenz & Kopf, LLP

(57) ABSTRACT

A combustor for a gas turbine engine includes an outer liner having a first end interconnected to an opposite second end by an outer liner wall composed of a plurality of outer segments. The inner liner has a first inner end interconnected to an opposite second inner end by an inner liner wall composed of a plurality of inner segments. The outer liner wall and the inner liner wall define a combustion chamber, and each of the outer wall segments extend at an angle of at least 40 degrees relative to a longitudinal axis. The outer wall segments includes a first segment, a second segment that extends at a second angle relative to the first segment, which is less than a third angle defined between the second segment and a third segment and is substantially the same as a fourth angle defined between the third segment and a fourth segment.

20 Claims, 11 Drawing Sheets

(56) References Cited

U.S. PATENT DOCUMENTS

| | | | |
|---|---|---|---|
| 8,171,736 B2* | 5/2012 | Hawie | F23R 3/06 |
| | | | 60/804 |
| 8,904,799 B2* | 12/2014 | Toqan | F23R 3/007 |
| | | | 60/755 |
| 10,775,044 B2 | 9/2020 | Dudebout et al. | |
| 10,895,157 B2 | 1/2021 | Dudebout et al. | |
| 2006/0053797 A1 | 3/2006 | Stastny et al. | |
| 2007/0245710 A1* | 10/2007 | Schumacher | F23R 3/54 |
| | | | 60/740 |
| 2008/0178599 A1* | 7/2008 | Hawie | F23R 3/50 |
| | | | 60/752 |
| 2011/0079013 A1* | 4/2011 | Mehring | F02C 3/145 |
| | | | 60/740 |
| 2012/0304647 A1* | 12/2012 | Dudebout | F23R 3/06 |
| | | | 60/754 |
| 2014/0109581 A1* | 4/2014 | Dudebout | F23R 3/16 |
| | | | 60/754 |
| 2014/0338346 A1 | 11/2014 | Stastny et al. | |
| 2014/0338347 A1 | 11/2014 | Gage et al. | |
| 2015/0113993 A1* | 4/2015 | Rudrapatna | F23R 3/283 |
| | | | 419/53 |
| 2015/0226433 A1 | 8/2015 | Dudebout et al. | |
| 2016/0033129 A1 | 2/2016 | Burd | |
| 2016/0040543 A1 | 2/2016 | Stastny et al. | |
| 2016/0230993 A1 | 8/2016 | Dai et al. | |
| 2017/0023249 A1* | 1/2017 | Sreekanth | F01D 9/023 |
| 2017/0067640 A1* | 3/2017 | Savary | F23R 3/46 |
| 2018/0179956 A1 | 6/2018 | Wertz | |
| 2019/0086085 A1 | 3/2019 | Lind et al. | |
| 2020/0132304 A1 | 4/2020 | Dudebout et al. | |

\* cited by examiner

COMBUSTOR FOR GAS TURBINE ENGINE AND METHOD OF MANUFACTURE

TECHNICAL FIELD

The present disclosure generally relates to combustors for use with engines, and more particularly relates to a combustor for a gas turbine engine and a method for manufacturing the combustor.

BACKGROUND

Gas turbine engines may be employed to power various devices. For example, a gas turbine engine may be employed to power a mobile platform, such as an aircraft. In a gas turbine engine, air is compressed in a compressor, and mixed with fuel and ignited in a combustor to generate hot combustion gases, which flow downstream into a turbine section for energy extraction. Due to the high temperatures in many gas turbine engine applications, it is desirable to regulate the operating temperature of certain engine components, particularly those within the mainstream hot gas flow path in order to prevent overheating. As such, it is desirable to cool the combustor components, to prevent or reduce adverse impact and extend useful life. In certain examples, the combustor may include effusion cooling holes to assist in cooling the combustor. Certain effusion cooling holes include a complex geometry, which is not capable of being machined or cast into the combustor.

Accordingly, it is desirable to provide a combustor a method for manufacturing the combustor with the effusion cooling holes to provide improved cooling for the combustor. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a combustor for a gas turbine engine. The combustor includes an outer liner having a first end and a second end opposite the first end. The first end is interconnected to the second end by an outer liner wall composed of a plurality of outer wall segments. The combustor includes an inner liner having a first inner end and a second inner end opposite the first inner end. The second inner end is coupled to the second end of the outer liner, and the first inner end interconnected to the second inner end by an inner liner wall composed of a plurality of inner wall segments. Each of the outer liner wall and the inner liner wall cooperate to define a combustion chamber, and each of the plurality of outer wall segments extend at an angle of at least 40 degrees relative to a longitudinal axis of the combustor. The plurality of outer wall segments includes a first wall segment, a second wall segment that extends at a second angle relative to the first wall segment, which is less than a third angle defined between the second wall segment and a third wall segment of the plurality of outer wall segments and is substantially the same as a fourth angle defined between the third wall segment and a fourth wall segment of the plurality of outer wall segments.

The first wall segment of the plurality of outer wall segments is at the first end of the outer liner. At least one of the outer liner wall and the inner liner wall has a double wall, with an effusion cooling system defined between the double wall. The fourth angle is different than a fifth angle defined between the fourth wall segment and a fifth wall segment of the plurality of outer wall segments. The first wall segment, the second wall segment, the third wall segment, the fourth wall segment and the fifth wall segment are each integrally formed. The combustor includes a sixth wall segment, and the sixth wall segment cooperates with the inner liner to define a passageway to an outlet of the combustor. Each of the plurality of inner wall segments extend at an angle of at least 40 degrees relative to the longitudinal axis. The plurality of inner wall segments includes a first inner wall segment and a second inner wall segment, and the second inner wall segment extends at a tenth angle relative to the first inner wall segment. The plurality of inner wall segments includes a third inner wall segment that extends at an eleventh angle relative to the second inner wall segment, and the eleventh angle is different than the tenth angle. The plurality of inner wall segments includes a fourth inner wall segment that extends at a twelfth angle relative to the third inner wall segment, and the twelfth angle is different than the tenth angle. The plurality of inner wall segments includes a fifth inner wall segment that extends at a thirteenth angle relative to the third inner wall segment, and the thirteenth angle is different than the twelfth angle. The third wall segment defines at least one fuel injector hole.

Also provided according to various embodiments is a method of manufacturing a combustor for a gas turbine engine. The method includes forming an outer liner having a first end, a second end opposite the first end and an outer liner wall interconnecting the first end and the second end. The outer liner wall includes a plurality of wall segments that each extend at an angle of at least 40 degrees relative to a longitudinal axis of the combustor. The method includes substantially concurrently with the forming of the outer liner, forming an inner liner nested within the outer liner wall, the inner liner having a first inner end and a second inner end opposite the first inner end. The method includes coupling the second inner end of the inner liner to the second end of the outer liner to define a combustion chamber. The method includes additively manufacturing the outer liner and the inner liner and the longitudinal axis of the combustor is coaxial with a build direction of the combustor during the additive manufacturing. The method includes forming an inner liner wall that interconnects the first inner end and the second inner end, and the inner liner wall includes a plurality of inner wall segments that each extend at an angle of at least 40 degrees relative to the longitudinal axis of the combustor. The method includes welding the second inner end of the inner liner to the second end of the outer liner. The method includes forming the outer liner with a double wall and an effusion cooling system defined within the double wall. The method includes forming an additional wall segment and coupling the additional wall segment to the first wall segment of the outer liner.

Further provided is a combustor for a gas turbine engine that includes an outer liner having a first end and a second end opposite the first end. The first end is interconnected to the second end by an outer liner wall composed of a plurality of outer wall segments. The combustor includes an inner liner having a first inner end and a second inner end opposite the first inner end. The second inner end is coupled to the second end of the outer liner, and the first inner end is interconnected to the second inner end by an inner liner wall composed of a plurality of inner wall segments. Each of the outer liner wall and the inner liner wall cooperate to define a combustion chamber, and each of the plurality of outer wall segments and the plurality of inner wall segments extends at an angle of at least 40 degrees relative to a longitudinal axis of the combustor. The plurality of outer wall segments includes a first wall segment that extends along a first axis that is substantially perpendicular to the longitudinal axis, a second wall segment that extends along a second axis that is transverse to the first axis and to the longitudinal axis, and a third wall segment that extends along a third axis that is substantially parallel to the longitudinal axis and transverse to the second axis.

The plurality of outer wall segments includes a fourth wall segment that extends along a fourth axis that is transverse to the third axis and the longitudinal axis, and a fifth wall segment that extends along a fifth axis that is transverse to the fourth axis and substantially parallel to the longitudinal axis.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
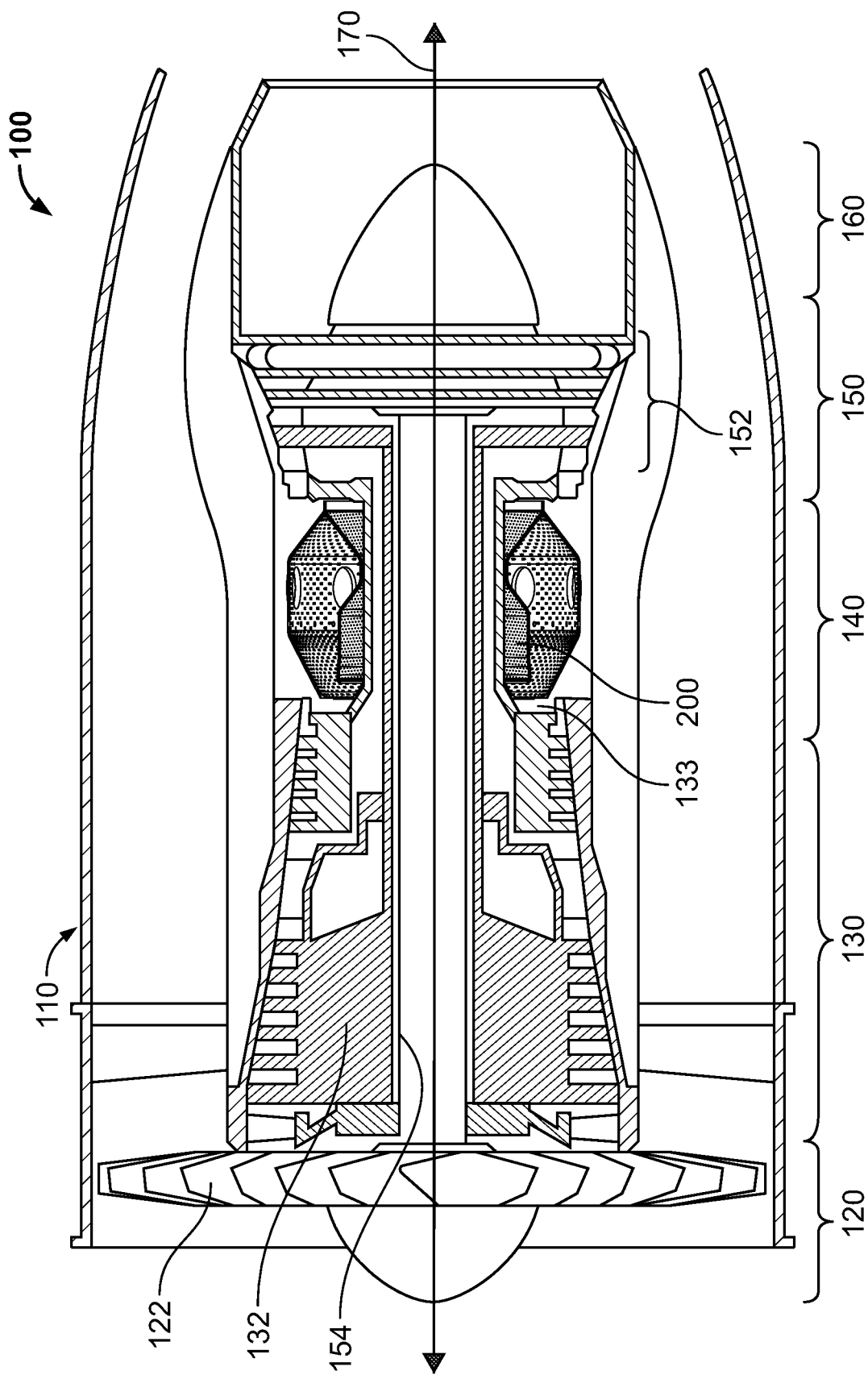
FIG. 1 is a schematic cross-sectional illustration of an engine, such as a gas turbine engine, which includes an exemplary combustor in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of combustor, and that the example of a combustor for a gas turbine engine is merely one exemplary embodiment according to the present disclosure. In addition, while combustor is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel. Also as used herein, the terms "integrally formed" and "integral" mean one-piece and exclude brazing, fasteners, or the like for maintaining portions thereon in a fixed relationship as a single unit. The term "substantially" indicates within 10% of a given value or position to account for manufacturing tolerances.

With reference to FIG. 1, a simplified cross-sectional view of an exemplary gas turbine engine 100 is shown with the remaining portion of the gas turbine engine 100 being axisymmetric about a longitudinal axis 170, which also comprises an axis of rotation for the gas turbine engine 100. The gas turbine engine 100 may be disposed in an engine case 110 and may include a fan section 120, a compressor section 130, a combustion section 140, a turbine section 150, and an exhaust section 160. As will be discussed, the combustion section 140 includes a combustor 200, which is configured to be additively manufactured without requiring supports. Generally, the structure of the combustor 200 enables the combustor 200 to be additively manufactured, which enables an effusion cooling system 198 (FIG. 4) to be defined in the combustor 200, thereby improving a cooling of the combustor 200 and increasing a life of the combustor 200 while reducing maintenance costs.

With continued reference to FIG. 1, the fan section 120 may include a fan 122, which draws in and accelerates at least a portion of the air into the compressor section 130. The compressor section 130 may include a series of compressors 132 that raise the pressure of the air directed from the fan 122. The compressors 132 then direct the compressed air into the combustion section 140. In one example, the compressed air may be directed from the compressors 132 into a plenum 133 surrounding a combustor 200 of the combustion section 140. In the combustion section 140, the high pressure air is mixed with fuel and combusted in the combustor 200. The combusted air is then directed into the turbine section 150 via a turbine nozzle, for example.

The turbine section 150 may include a series of turbines 152, which may be disposed in axial flow series. The combusted air from the combustion section 140 expands through and rotates the turbines 152 prior to being exhausted through the exhaust section 160. In one embodiment, the turbines 152 rotate to drive equipment in the gas turbine engine 100 via concentrically disposed shafts or spools. For example, the turbines 152 may drive the compressors 132 via one or more shafts 154. FIG. 1 depicts one exemplary configuration, and other embodiments may have alternate arrangements. It should be noted that the embodiments described herein are applicable to both commercial and military gas turbine engines and auxiliary power units. Moreover, as mentioned previously, exemplary embodiments may find beneficial uses in many industries, including aerospace and particularly in high performance aircraft, as well as automotive, marine and power generation.

In this example, the combustor 200 is substantially symmetric about the longitudinal axis 170, and has a centerline C that is substantially coaxial with the longitudinal axis 170. The longitudinal axis 170 of the gas turbine engine 100 also defines a longitudinal axis for the combustor 200. In one example, the combustor 200 is a reverse flow combustor. The combustor 200 includes an outer liner 202 and an inner liner 204 that cooperate to define a combustion chamber 206. The outer liner 202 defines an outer perimeter or circumference of the combustor 200, while the inner liner 204 defines an inner perimeter or circumference of the combustor 200. In one example, the outer liner 202 includes a first outer end 210, a second outer end 212 opposite the first outer end 210, and an outer liner wall 214. The first outer end 210 is fluidly coupled to the turbine section 150 to direct the combustive gas flow from the combustor 200 to the turbine section 150. The second outer end 212 is upstream from the first outer end 210 in a direction of working fluid flow through the gas turbine engine 100, and is coupled to the inner liner 204 to enclose the combustion chamber 206.

Figure 3:
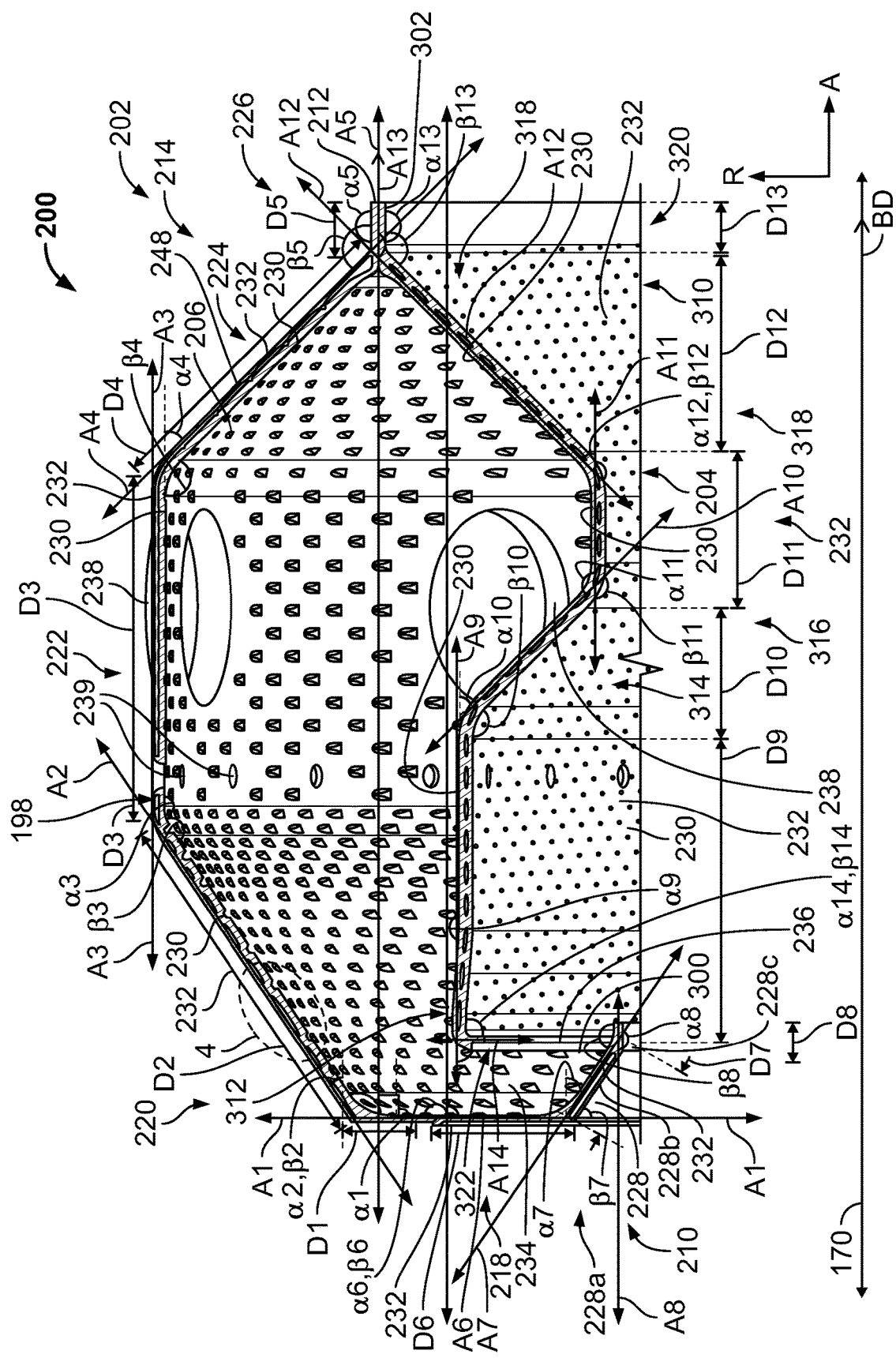
FIG. 3 is a cross-sectional view of the combustor of FIG. 2, taken along line 3-3 of FIG. 2.

With reference to FIG. 3, the outer liner wall 214 is shown in greater detail. In one example, the outer liner wall 214 is composed of a plurality of outer liner wall segments 216, including: a first wall segment 218, a second wall segment 220, a third wall segment 222, a fourth wall segment 224 and a fifth wall segment 226. In one example, a sixth wall segment 228 is connected to or formed with the first wall segment 218. Each of the first wall segment 218, the second wall segment 220, the third wall segment 222, the fourth wall segment 224, the fifth wall segment 226 and the sixth wall segment 228 have a double wall, with an inner wall 230 opposite an outer wall 232. As will be discussed, the effusion cooling system 198 is defined between the inner wall 230 and the outer wall 232 and provides cooling for the combustor 200.

Figure 2:
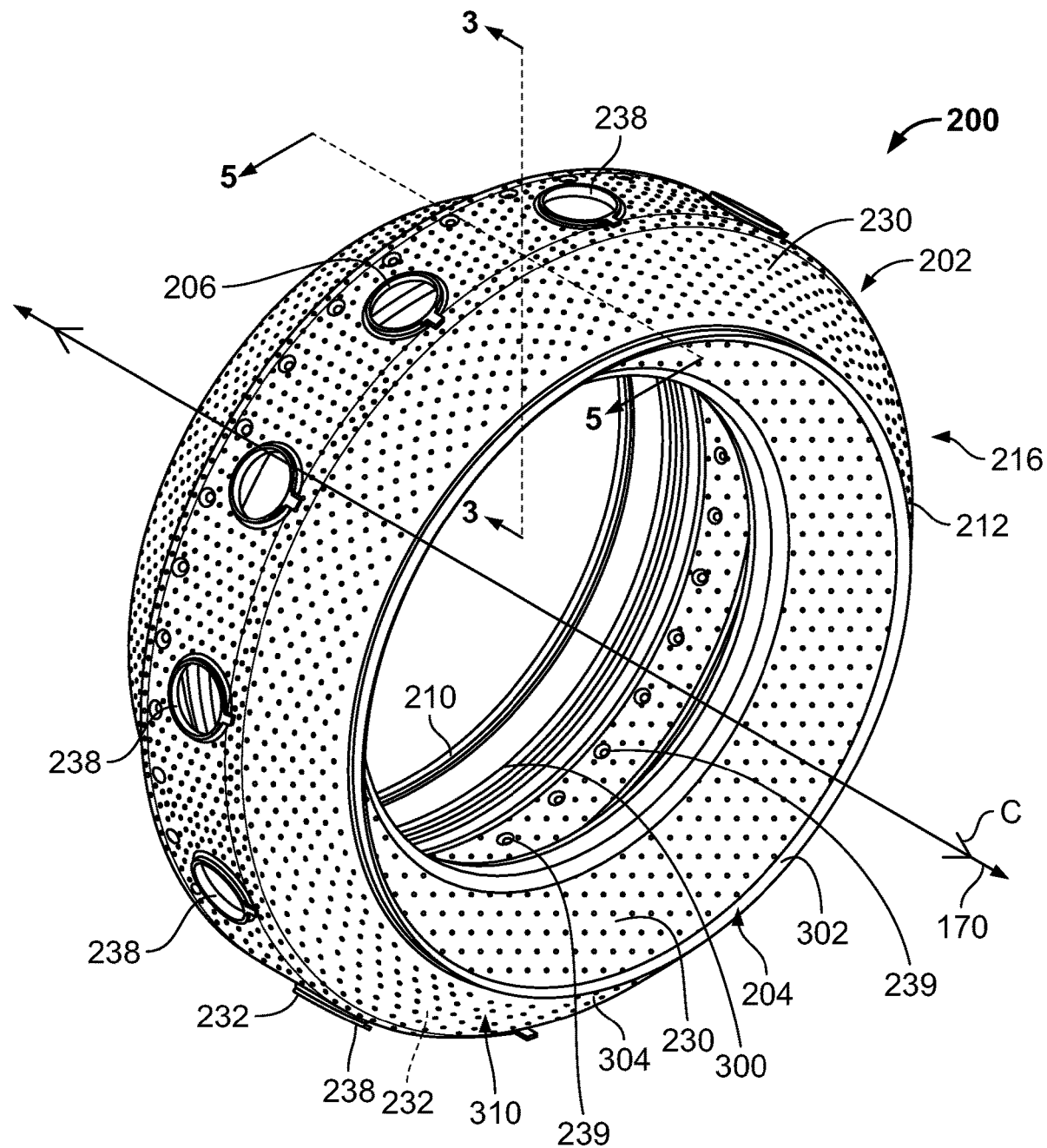
FIG. 2 is a perspective view of the combustor of FIG. 1.

In addition, each of the first wall segment 218, the second wall segment 220, the third wall segment 222, the fourth wall segment 224, the fifth wall segment 226 and the sixth wall segment 228 are defined so as to extend at an angle of at least 40 degrees relative to a build direction BD of the combustor 200. The build direction BD extends in an axial direction A, and is perpendicular to a radial direction R. In this example, the build direction BD is substantially parallel to and coaxial with the longitudinal axis 170, and is substantially parallel to and coaxial with the centerline C of the combustor 200 (FIG. 2). The first wall segment 218 is defined at the first outer end 210, and extends for a first distance D1. The first wall segment 218 has a first angle $\alpha 1$ relative to the build direction BD. In this example, the first angle $\alpha 1$ is about 90 degrees. The first wall segment 218 is connected to or integrally formed with the second wall segment 220 and is fixedly coupled to the sixth wall segment 228.

The second wall segment 220 is connected to or integrally formed with the first wall segment 218 and the third wall segment 222. The second wall segment 220 extends for a second distance D2, which is different and greater than the first distance D1. The second distance D2 cooperates with the first wall segment 218 to define a passageway 234 between the outer liner 202 and the inner liner 204. The passageway 234 directs the combustive gas flow to exit the combustor 200 at an outlet 236 in fluid communication with the turbine section 150. The second wall segment 220 extends at a second angle $\alpha 2$ relative to the build direction BD. In this example, second angle $\alpha 2$ is about 45 degrees. The second wall segment 220 also extends at a second angle $\beta 2$ relative to the first wall segment 218. In this example, second angle $\beta 2$ is about 45 degrees.

The third wall segment 222 is connected to or integrally formed with the second wall segment 220 and the fourth wall segment 224. The third wall segment 222 extends for a third distance D3, which is different and less than the second distance D2. The third distance D3 is predetermined to accommodate one or more fuel injector holes 238 and one or more quench holes 239. The fuel injector holes 238 receive a respective fuel injector (not shown). A single row of quench holes 239 is shown in FIG. 3, although other arrangements may be provided.

The fuel injector holes 238 are defined through the third wall segment 222 proximate the fourth wall segment 224. Stated another way, the fuel injector holes 238 are defined through the third wall segment 222 so as to be axially offset toward the fourth wall segment 224. The fuel injector holes 238 are defined so as to be spaced apart about the perimeter or circumference of the combustor 200 (FIG. 2). The third wall segment 222 extends at a third angle $\alpha 3$ relative to the build direction BD. In this example, the third angle $\alpha 3$ is about 180 degrees. The third wall segment 222 also extends at a third angle $\beta 3$ relative to the second wall segment 220. In one example, the third angle $\beta 3$ is about 135 degrees.

The fourth wall segment 224 is connected to or integrally formed with the third wall segment 222 and the fifth wall segment 226. The fourth wall segment 224 extends for a fourth distance D4, which is different and less than the second distance D2. The fourth wall segment 224 extends at a fourth angle $\alpha 4$ relative to the build direction BD. In this example, the fourth angle $\alpha 4$ is about 45 degrees. The fourth wall segment 224 also extends at a fourth angle $\beta 4$ relative to the third wall segment 222. In one example, the fourth angle $\beta 4$ is about 45 degrees.

The fifth wall segment 226 is connected to or integrally formed with the fourth wall segment 224 and terminates at the second outer end 212 of the outer liner 202. The fifth wall segment 226 extends for a fifth distance D5, which is different and less than the second distance D2, the third distance D3 and the fourth distance D4. The fifth wall segment 226 extends at a fifth angle $\alpha 5$ relative to the build direction BD. In this example, the fifth angle $\alpha 5$ is about 180 degrees. The fifth wall segment 226 also extends at a fifth angle β5 relative to the fourth wall segment 224. In one example, the fifth angle β5 is about 135 degrees.

The sixth wall segment 228 is connected to the first wall segment 218. In one example, the sixth wall segment 228 is fixedly coupled to the first wall segment 218 via welding. The sixth wall segment 228 extends includes a first sub-segment 228a that is coupled to the first wall segment 218 at the first outer end 210 of the outer liner 202, a second sub-segment 228b that extends radially inward from the first outer end 210 of the outer liner 202 and a third sub-segment 228c. The first sub-segment 228a of the sixth wall segment 228 extends for a sixth distance D6, which is different and greater than the first distance D1 and the fifth distance D5. The second sub-segment 228b of the sixth wall segment 228 extends for a seventh distance D7, which is different and less than the second distance D2, the third distance D3 and the fourth distance D4. The first sub-segment 228a of the sixth wall segment 228 extends at a sixth angle α6 relative to the build direction BD. In this example, the sixth angle α6 is about 90 degrees. The first sub-segment 228a also extends at a sixth angle β6 relative to the first wall segment 218. In one example, the sixth angle β6 is about 180 degrees.

The second sub-segment 228b of the sixth wall segment 228 extends at a seventh angle α7 relative to the build direction BD. In this example, the seventh angle α7 is about 45 degrees. The second sub-segment 228b of the sixth wall segment 228 also extends at a seventh angle β7 relative to the first sub-segment 228a. In one example, the seventh angle β7 is about 45 degrees. The second sub-segment 228b of the sixth wall segment 228 cooperates with the inner liner 204 to define the passageway 234 to direct the combustive gas flow to the turbine section 150 (FIG. 1).

The third sub-segment 228c may be connected to or integrally formed with the second sub-segment 228b of the sixth wall segment 228 and terminates proximate a first inner end 300 of the inner liner 204. The third sub-segment 228c cooperates with the inner liner 204 to define the outlet 236. In this example, the third sub-segment 228c extends radially inward for an eighth distance D8, and overlaps with a portion of the inner liner 204 to define the outlet 236. The eighth distance D8 is different and less than the distances D1-D6. The third sub-segment 228c extends at an eighth angle α8 relative to the build direction BD. In this example, the eighth angle α8 is about 180 degrees. The third sub-segment 228c also extends at an eighth angle β8 relative to the second sub-segment 228b of the sixth wall segment 228. In one example, the eighth angle β8 is about 135 degrees.

Thus, in this example, the outer liner 202 has the first wall segment 218 and the first sub-segment 228a that extends along a first axis A1, which is substantially perpendicular to the longitudinal axis 170. The second wall segment 220 extends along a second axis A2, which is transverse or oblique to the first axis A1 and the longitudinal axis 170. The third wall segment 222 extends along a third axis A3, which is substantially parallel to the longitudinal axis 170 and transverse to the second axis A2. The fourth wall segment 224 extends along a fourth axis A4, which is transverse or oblique to the second axis A2 and the longitudinal axis 170. The fifth wall segment 226 extends along a fifth axis A5, which is substantially parallel to the longitudinal axis 170 and transverse to the fourth axis A4. The first sub-segment 228a of the sixth wall segment 228 extends along a sixth axis A6, which is substantially parallel to the first axis A1 and substantially perpendicular to the longitudinal axis 170. The second sub-segment 228b of the sixth wall segment 228 extends along a seventh axis A7, which is transverse or oblique to the first axis A1 and the longitudinal axis 170. The third sub-segment 228c extends along an eighth axis A8, which is substantially parallel to the longitudinal axis 170 and transverse to the sixth axis A6. The axes A2, A4 and A6 are each transverse to the build direction BD, and the axes A3, A5 and A8 are each substantially parallel to the build direction BD. The axes A1 and A6 are each substantially perpendicular to the build direction BD.

The outer liner 202 also has the first wall segment 218 that extends at the first angle α1 relative to the build direction BD, which is different and greater than the second angle α2 of the second wall segment 220. The second wall segment 220 also extends at the second angle β2 relative to the first wall segment 218, which is different and less than the third angle β3 defined between the second wall segment 220 and the third wall segment 222. The third wall segment 222 extends at the third angle α3 relative to the build direction BD, which is different and greater than the second angle α2 of the second wall segment 220 and the fourth angle α4 of the fourth wall segment 224. The third wall segment 222 also extends at the fourth angle β4 relative to the fourth wall segment 224, which is different and less than the fifth angle β5 defined between the fourth wall segment 224 and the fifth wall segment 226. The second angle β2 is substantially the same or the same as the fourth angle β4. The fourth wall segment 224 extends at the fourth angle α4 relative to the build direction BD, which is different and less than the fifth angle α5 of the fifth wall segment 226.

Figure 4:
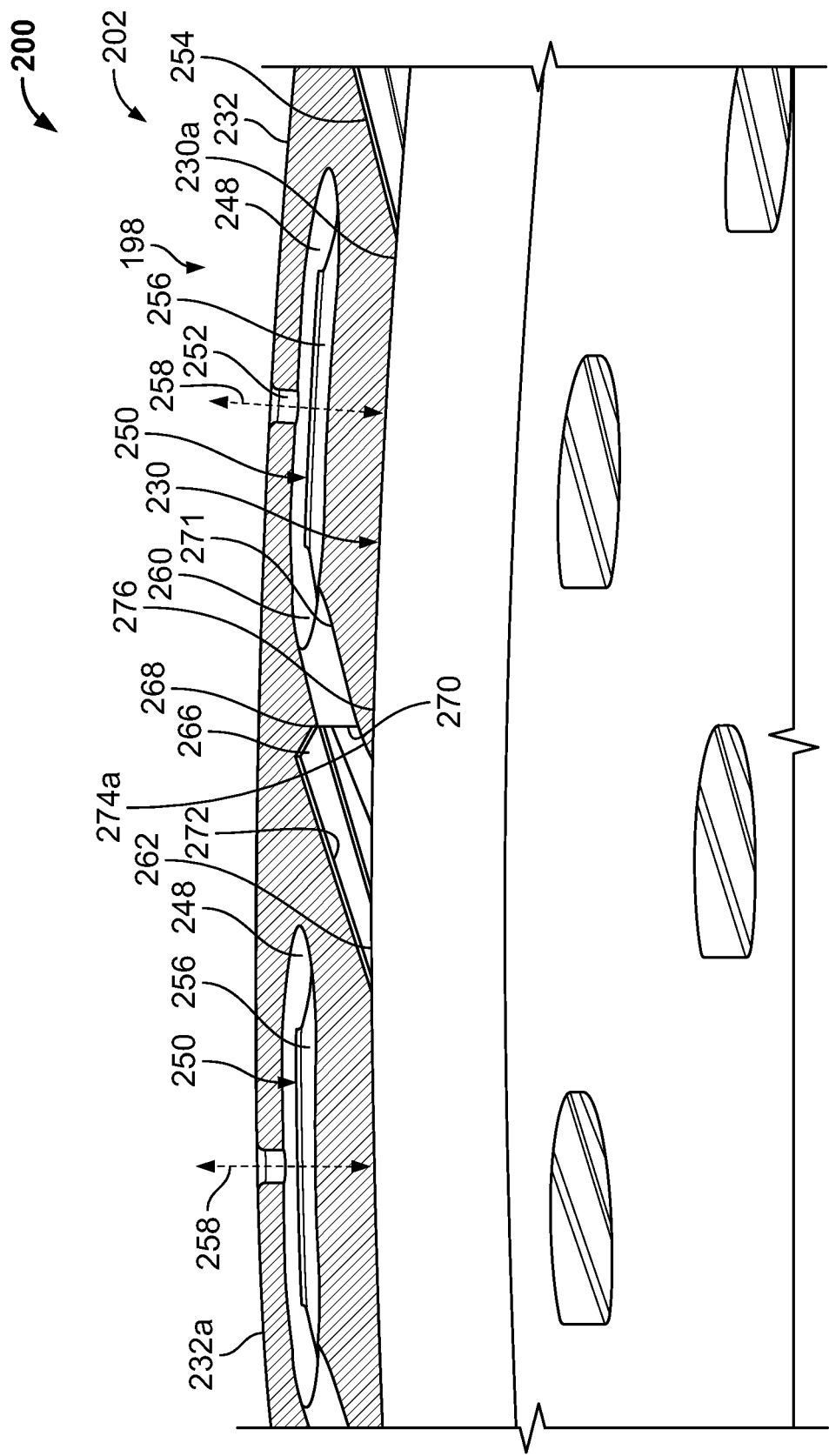
FIG. 4 is a detail cross-sectional view of a double wall and effusion cooling system associated with an outer liner of the combustor, taken at 4 on FIG. 3.

With reference to FIG. 4, a detail view of the double wall of the outer liner 202 is shown. As discussed, each of the wall segments 218, 220, 222, 224, 226, 228a, 228b and 228c associated with the outer liner wall 214 have the double wall, with an inner wall 230 opposite an outer wall 232 that defines an intervening cavity 248 between the inner wall 230 and the outer wall 232. As shown in FIG. 4, the effusion cooling system 198 is defined between the inner wall 230 and the outer wall 232. In this example, the effusion cooling system 198 includes a plurality of pedestals 250, a plurality of impingement cooling holes 252 and a plurality of effusion cooling passages 254. During use, the inner wall 230 is exposed to the hot combustive gas flow, and is a hot wall. Conversely, the outer wall 232 is exposed to the air that flows into the plenum 133 and is a cold wall. As each of the plurality of pedestals 250 and the plurality of impingement cooling holes 252 are substantially the same as the plurality of pedestals 306 and the plurality of impingement cooling holes 252 of commonly assigned U.S. Pat. No. 10,775,044, the relevant portion of which is incorporated herein by reference, the plurality of pedestals 250 and the plurality of impingement cooling holes 252 will not be discussed in great detail herein.

Briefly, each of the pedestals 250 is coupled to or integrally formed with an inner wall surface 230a of the inner wall 230 and an outer wall surface 232a of the outer wall 232, and extends through the intervening cavity 248. Each pedestal 250 is spaced apart from every other pedestal 250, and each has at least one exterior surface 256 facing the intervening cavity 248. That is, the pedestals 250 are discrete, and do not share exterior surfaces 256. Each pedestal 250 has a principal axis 258, and extends through the intervening cavity 248 about its principal axis 258. It will be appreciated that the pedestals 250 could be formed to have any one of numerous shapes. In this example, each pedestal 250, when taken along a cross section perpendicular to its principal axis 258, has a circular cross-sectional shape. In other embodiments, however, each pedestal 250, when taken along a cross section perpendicular to its principal axis 258, may have a non-circular cross-sectional shape, such as, for example, elliptical or any one of numerous polygonal shapes. Each of the impingement cooling holes 252 extends through the outer wall 232 to admit a flow of cooling air into the intervening cavity 248.

Each of the effusion cooling passages 254 is associated with a different one of the plurality of pedestals 250, and each has an inlet 260 and an outlet 262. The inlet 260 of each effusion cooling passage 254 is defined proximate the exterior surface 256 of its associated pedestal 250, and the outlet 262 of each effusion cooling passage 254 is defined on the inner wall surface 230a of the inner wall 230. Each effusion cooling passage 254 is disposed at a predetermined angle γ relative to the principal axis 258 of its associated pedestal 250. The predetermined angle γ may vary, and in one example, is in the range of about 45 degrees to about 80 degrees. In one example, the principal axis 258 is defined at about 90 degrees (+/−20 degrees) relative to the inner wall surface 230a and the outer wall surface 232a. In one example, the effusion cooling passage 254 is substantially the same as the effusion cooling aperture 400 of commonly assigned U.S. Pat. No. 10,895,157, the relevant portion of which is incorporated herein by reference, the effusion cooling passages 254 will not be discussed in great detail herein. In this example, the outlet 262 of each of the effusion cooling passages 254 includes a recessed portion 266, which is a void area beginning at the inner wall surface 230a of the inner wall 230 and extending inwardly toward the outer wall 232. The recessed portion 266 includes a surface 268, which surrounds an exit opening 270. The exit opening 270 is fluidly coupled via a metering passage 271 to the inlet 260 to receive the cooling fluid from the intervening cavity 248. The cooling fluid from the intervening cavity 248 flows through the metering passage 271 exits into the recessed portion 266 at the outlet 262. The recessed portion 266 further includes an inward surface 272, which extends from the surface 268 to the inner wall surface 230a of the inner wall 230, at point P. The recessed portion 266 at the outlet 262 enables the pressurized air to diffuse and form a film of cooling fluid along the inner wall surface 230a of the inner wall 230.

Figure 5:
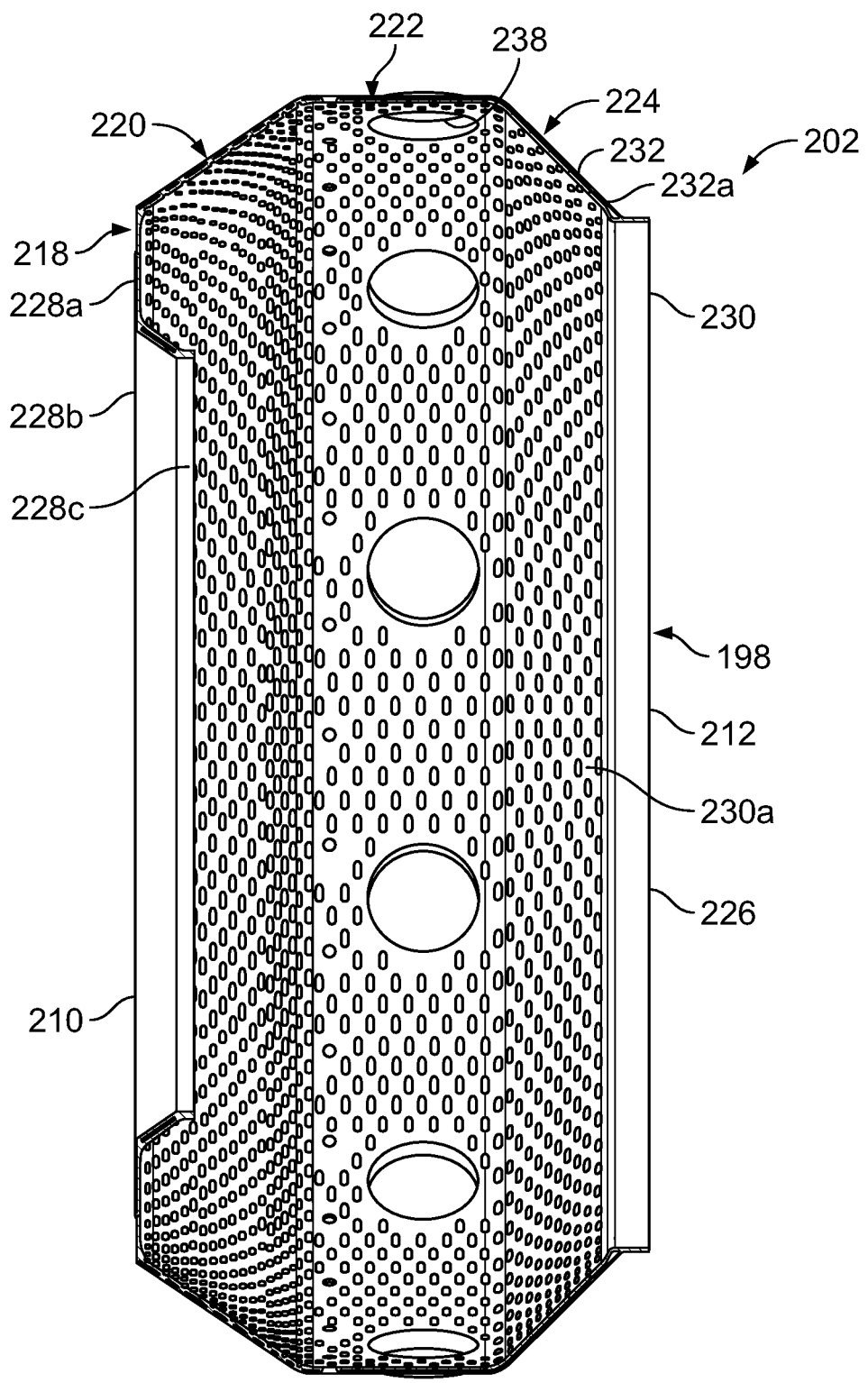
FIG. 5 is a cross-sectional view of an inner wall surface of the outer liner, taken along line 5-5 of FIG. 2.

With reference to FIG. 5, the inner wall surface 230a of the outer liner 202 is shown. As depicted in FIG. 5, the effusion cooling passages 254 may be defined so as to be spaced apart about the perimeter or circumference of the outer liner 202. Generally, the outlets 262 of the effusion cooling passages 254 are arranged to define a film of cooling fluid over the inner wall surface 230a of the outer liner 202 to provide cooling for the outer liner 202. It should be noted that the arrangement of the effusion cooling system 198 in FIG. 5, including the outlets 262 of the effusion cooling passages 254 is merely an example, and the effusion cooling system 198 may be arranged as needed to meet the predetermined cooling requirements for the combustor 200.

With reference to FIG. 4, the effusion cooling passages 254 also include an overhang portion 274 that extends axially over the recessed portion 266 beginning from the surface 268. The overhang portion 274 includes an outer surface 276, which is an extension of the inner wall surface 230a of the inner wall 230 as it extends over the recessed portion 266. The overhang portion 274 includes an inner surface 274a, which extends over the recessed portion 266. The overhang portion 274 protects the exit opening 270 from plugging when a thermal barrier coating is applied to the combustor 200.

With reference back to FIG. 2, the inner liner 204 includes a first inner end 300, a second inner end 302 opposite the first inner end 300, and an inner liner wall 304. The first inner end 300 is fluidly coupled to the turbine section 150 to direct the combustive gas flow from the combustor 200 to the turbine section 150 (FIG. 1). The second inner end 302 is upstream from the first inner end 300 in a direction of working fluid flow through the gas turbine engine 100, and is coupled to the outer liner 202 to enclose the combustion chamber 206.

Figure 6:
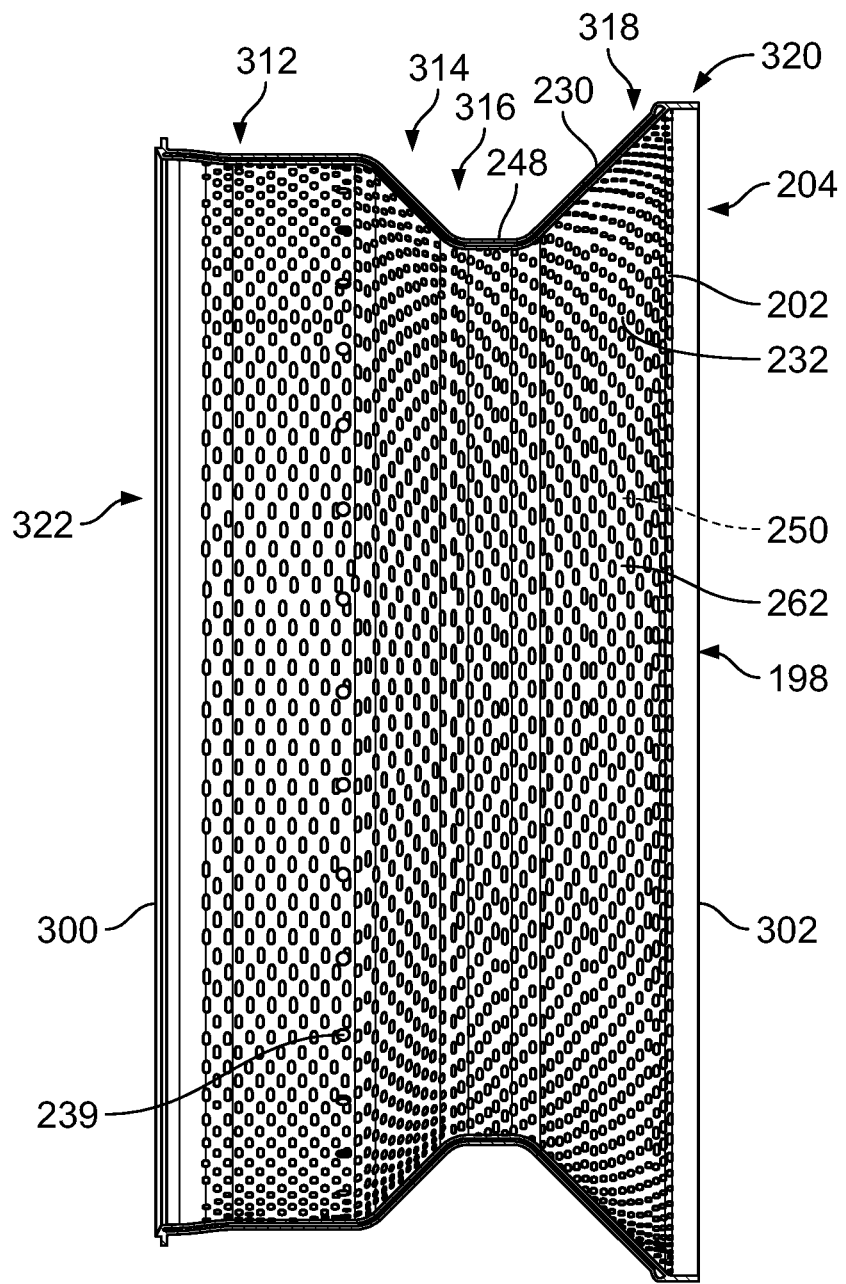
FIG. 6 is a cross-sectional view of an inner wall surface of an inner liner of the combustor, taken along line 6-6 of FIG. 2.

With reference to FIG. 3, the inner liner wall 304 is shown in greater detail. In one example, the inner liner wall 304 is composed of a plurality of inner liner wall segments 310, including: a first inner wall segment 312, a second inner wall segment 314, a third inner wall segment 316, a fourth inner wall segment 318, a fifth inner wall segment 320 and a sixth inner wall segment 322. Each of the first inner wall segment 312, the second inner wall segment 314, the third inner wall segment 316, the fourth inner wall segment 318, the fifth inner wall segment 320 and the sixth inner wall segment 322 have a double wall, with the inner wall 230 opposite the outer wall 232. In this example, the double wall including the effusion cooling system 198 is the same between the outer liner 202 and the inner liner 204. Thus, the double wall and the effusion cooling system 198 associated with the inner liner 204 will not be discussed in detail herein. Briefly, with reference to FIG. 6, the inner wall surface 230a of the inner liner 204 is shown. The inner wall 230 of the inner liner 204 is opposite the outer wall 232 and defines the intervening cavity 248 between the inner wall 230 and the outer wall 232. The effusion cooling system 198 is defined between the inner wall 230 and the outer wall 232 of each of the first inner wall segment 312, a second inner wall segment 314, a third inner wall segment 316, a fourth inner wall segment 318, a fifth inner wall segment 320 and a sixth inner wall segment 322.

In addition, each of the first inner wall segment 312, the second inner wall segment 314, the third inner wall segment 316, the fourth inner wall segment 318, the fifth inner wall segment 320 and the sixth inner wall segment 322 are defined so as to extend at an angle of at least 40 degrees relative to the build direction BD of the combustor 200. The first inner wall segment 312 is defined at the first inner end 300, and extends for a ninth distance D9. The ninth distance D9 is predetermined such that the first inner wall segment 312 is spaced a distance apart from the first sub-segment 228a of the sixth wall segment 228 of the outer liner 202 to form the passageway 234. The first inner wall segment 312 extends along the ninth distance D9 so as to be opposite a portion of the second wall segment 220 and the third wall segment 222. The first inner wall segment 312 has a ninth angle α9 relative to the build direction BD. In this example, the ninth angle α9 is about 180 degrees. The first inner wall segment 312 is connected to or integrally formed with the second inner wall segment 314 and the sixth inner wall segment 322. The first inner wall segment 312 includes the one or more quench holes 239. A single row of quench holes 239 is shown, although other arrangements may be provided.

The second inner wall segment 314 is connected to or integrally formed with the first inner wall segment 312 and the third inner wall segment 316. The second inner wall segment 314 extends for a tenth distance D10, which is different and less than the ninth distance D9. The second inner wall segment 314 extends at a tenth angle α10 relative to the build direction BD. In this example, tenth angle α10 is about 45 degrees. The second inner wall segment 314 also extends at a tenth angle β10 relative to the first inner wall segment 312. In one example, the tenth angle β10 is about 135 degrees.

The third inner wall segment 316 is connected to or integrally formed with the second inner wall segment 314 and the fourth inner wall segment 318. The third inner wall segment 316 extends for an eleventh distance D11, which is different and less than the ninth distance D9 and the tenth distance D10. The eleventh distance D11 cooperates with the tenth distance D10 such that the second inner wall segment 314 and the third inner wall segment 316 are substantially opposite the fuel injector holes 238. In this example, the second inner wall segment 314 and the third inner wall segment 316 are substantially opposite a portion of the third wall segment 222. The third inner wall segment 316 extends at an eleventh angle $\alpha 11$ relative to the build direction BD. In this example, the eleventh angle $\alpha 11$ is about 180 degrees. The third inner wall segment 316 also extends at an eleventh angle $\beta 11$ relative to the second inner wall segment 314. In one example, the eleventh angle $\beta 11$ is about 45 degrees.

The fourth inner wall segment 318 is connected to or integrally formed with the third inner wall segment 316 and the fifth inner wall segment 320. The fourth inner wall segment 318 extends for a twelfth distance D12, which is different and greater than the ninth distance D9 and the tenth distance D10. The twelfth distance D12 is about the same as the fourth distance D4, and the fourth inner wall segment 318 is substantially opposite the fourth wall segment 224 of the outer liner 202. The fourth inner wall segment 318 extends at a twelfth angle $\alpha 12$ relative to the build direction BD. In this example, the twelfth angle $\alpha 12$ is about 45 degrees. The fourth wall segment 224 also extends at a twelfth angle $\beta 12$ relative to the third inner wall segment 316. In one example, the twelfth angle $\beta 12$ is about 45 degrees.

The fifth inner wall segment 320 is connected to or integrally formed with the fourth inner wall segment 318 and terminates at the second inner end 302 of the inner liner 204. The fifth inner wall segment 320 extends for a thirteenth distance D13, which is different and less than the ninth distance D9, the tenth distance D10, the eleventh distance D11 and the twelfth distance D12. The fifth inner wall segment 320 extends at a thirteenth angle $\alpha 13$ relative to the build direction BD. In this example, the thirteenth angle $\alpha 13$ is about 180 degrees. The fifth inner wall segment 320 also extends at a thirteenth angle $\beta 13$ relative to the fourth inner wall segment 318. In one example, the thirteenth angle $\beta 13$ is about 135 degrees. The fifth inner wall segment 320 extends for about the same length as the fifth wall segment 226 of the outer liner 202 to facilitate coupling or joining the inner liner 204 to the outer liner 202 at the respective second ends 302, 212.

The sixth inner wall segment 322 is connected to or integrally formed with the first inner wall segment 312 and extends radially inward at the first inner end 300 of the inner liner 204. The sixth inner wall segment 322 extends for a fourteenth distance, which is different and less than the distances D8-D12. The sixth inner wall segment 322 extends at a fourteenth angle $\alpha 14$ relative to the build direction BD. In this example, the fourteenth angle $\alpha 14$ is about 90 degrees. The sixth inner wall segment 322 also extends at a fourteenth angle $\beta 14$ relative to the first inner wall segment 312. In one example, the fourteenth angle $\beta 14$ is about 90 degrees. The sixth inner wall segment 322 cooperates with the first wall segment 218 of the outer liner 202 to define the passageway 234 to direct the combustive gas flow to the turbine section 150 (FIG. 1).

Thus, in this example, the inner liner 204 has the first inner wall segment 312 that extends along a ninth axis A9, which is substantially parallel to the longitudinal axis 170. The second inner wall segment 314 extends along a tenth axis A10, which is transverse or oblique to the ninth axis A9 and the longitudinal axis 170. The third inner wall segment 316 extends along an eleventh axis A11, which is substantially parallel to the longitudinal axis 170 and transverse to the tenth axis A10. The fourth inner wall segment 318 extends along a twelfth axis A12, which is transverse or oblique to the eleventh axis A11 and the longitudinal axis 170. The fifth inner wall segment 320 extends along a thirteenth axis A13, which is substantially parallel to the longitudinal axis 170 and transverse to the eleventh axis A11. The sixth inner wall segment 322 extends along a fourteenth axis A14, which is substantially perpendicular to the ninth axis A9 and the longitudinal axis 170. The axes A10 and A12 are each transverse to the build direction BD, and the axes A9 and A13 are each substantially parallel to the build direction BD. The fourteenth axis A14 is substantially perpendicular to the build direction BD.

The inner liner 204 also has the first inner wall segment 312 that extends at the ninth angle $\alpha 9$ relative to the build direction BD, which is different and greater than the tenth angle $\alpha 10$ of the second inner wall segment 314. The second inner wall segment 314 also extends at the tenth angle $\beta 10$ relative to the first inner wall segment 312, which is different and greater than the eleventh angle $\beta 11$ defined between the second inner wall segment 314 and the third inner wall segment 316. The third inner wall segment 316 extends at the eleventh angle $\alpha 11$ relative to the build direction BD, which is different and greater than the tenth angle $\alpha 10$ of the second inner wall segment 314 and the twelfth angle $\alpha 12$ of the fourth inner wall segment 318. The third inner wall segment 316 also extends at the twelfth angle $\beta 12$ relative to the fourth inner wall segment 318, which is different and less than the thirteenth angle $\beta 13$ defined between the fourth inner wall segment 318 and the fifth inner wall segment 320. The fourth inner wall segment 318 extends at the twelfth angle $\alpha 12$ relative to the build direction BD, which is different and less than the thirteenth angle $\alpha 13$ of the fifth inner wall segment 320.

It should be noted that in other applications, the combustor 200 may be configured differently for use with a gas turbine engine. For example, with reference to FIG. 7, a combustor 400 for use with a gas turbine engine 402 is shown. As the combustor 400 includes features that are substantially similar to or the same as the combustor 200 discussed with regard to FIGS. 1-6, the same reference numerals will be used to denote the same or similar features. In the example shown in FIG. 7, the gas turbine engine 402 is illustrated as a single spool engine. It should be noted that the use of a single spool engine is merely exemplary, as any number of spools can be employed. A tie-shaft 406 extends along an axis of rotation or longitudinal axis 440 of the gas turbine engine 402. In this example, the gas turbine engine 402 includes a compressor section 408, a combustion section 412, and a turbine section 410. In certain examples, the compressor section 408 includes one or more compressors 414, which are mounted to an upstream or forward end of the tie-shaft 406. The compressors 414 are in communication with a compressor section duct 416 to receive airflow from an intake section 417 of the gas turbine engine 402. The compressors 414 pressurize the air in the compressor section duct 416, and the compressor section duct 416 is in communication with the combustion section 412 to deliver the compressed air to a combustion chamber 418 of the combustion section 412. In one example, the compressed air may be directed from the compressors 132 into a plenum 433 surrounding a combustor 400 of the combustion section 412.

The combustion section 412 includes the combustor 400, which defines a combustion chamber 506. The compressed air from the compressor section 408 is mixed with fuel and ignited to produce combustive gases in the combustor 400. The combustive gases are directed from the combustion chamber 418 to the turbine section 410. The turbine section 410 includes at least one radial or axial turbine, and in this example, includes a radial turbine 420, which is mounted to an opposing, aft end of the tie-shaft 406 as the turbine for the gas turbine engine 402. The turbine section 410 also includes a turbine nozzle 424, which is in fluid communication with the combustion section 412 to receive combustion gases from the combustion chamber 418. The turbine nozzle 424 directs the combustion gases through the radial turbine 420.

The combustion gases drive rotation of the turbine, which in this example includes the radial turbine 420, and the rotation of the turbine drives further rotation of the tie-shaft 406 and the compressors 414. The rotation of the rotating group provides power output, which may be utilized in a variety of different manners, depending upon whether the gas turbine engine 402 assumes the form of a turbofan, turboprop, turboshaft, turbojet engine, or an auxiliary power unit, to list but a few examples.

Figure 8:
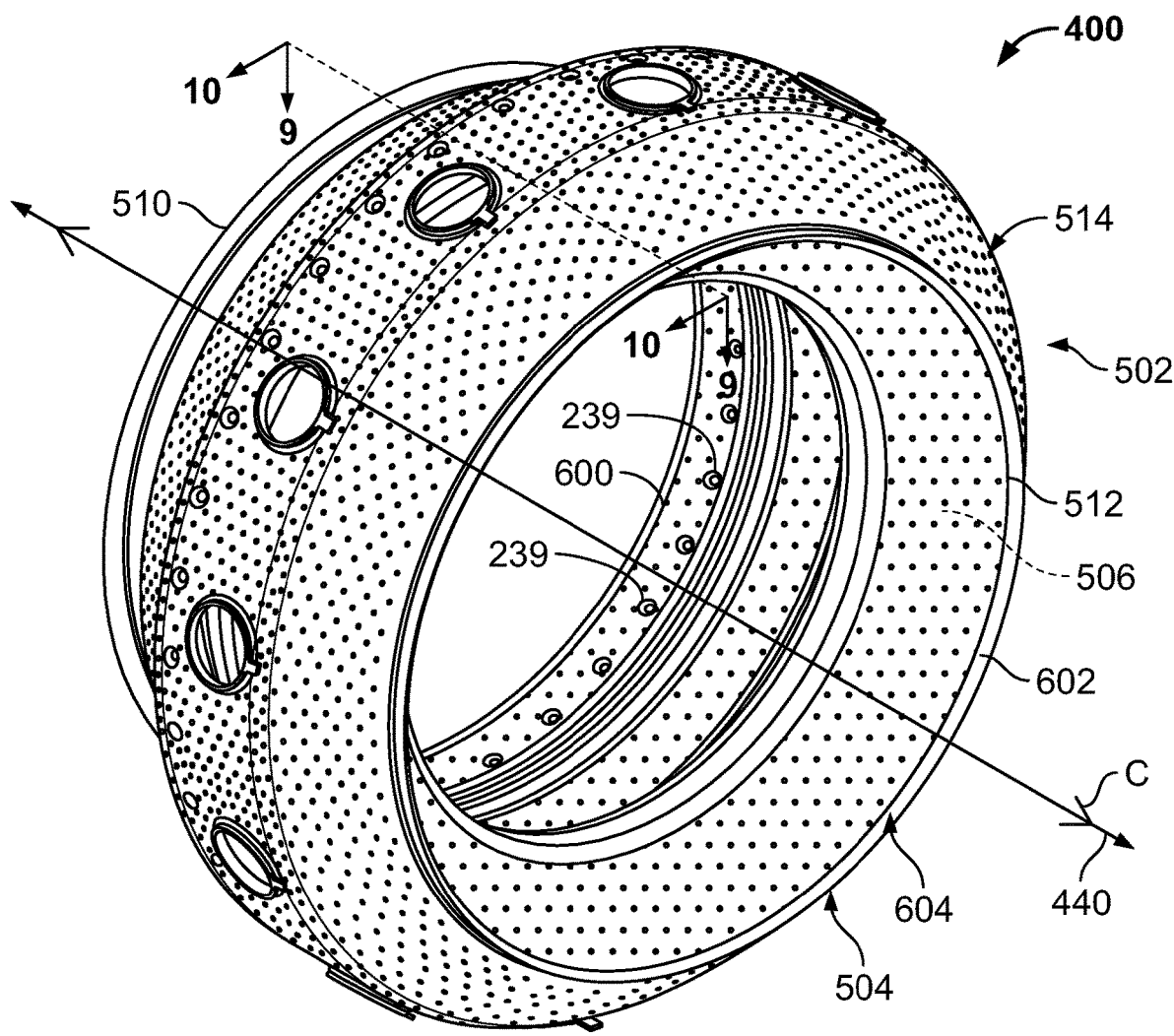
FIG. 8 is a perspective view of the combustor of FIG. 7.

With reference to FIG. 8, the combustor 400 is substantially symmetric about the longitudinal axis 440, and has a centerline C that is substantially coaxial with the longitudinal axis 440. The longitudinal axis 440 also defines a longitudinal axis for the combustor 400. In one example, the combustor 400 is a reverse flow combustor. The combustor 400 includes an outer liner 502 and an inner liner 504 that cooperate to define the combustion chamber 506. The outer liner 502 defines an outer perimeter or circumference of the combustor 400, while the inner liner 504 defines an inner perimeter or circumference of the combustor 400. In one example, the outer liner 502 includes a first outer end 510, a second outer end 512 opposite the first outer end 510, and an outer liner wall 514. The first outer end 510 is fluidly coupled to the turbine section 150 to direct the combustive gas flow from the combustor 400 to the turbine section 150. The second outer end 512 is upstream from the first outer end 510 in a direction of working fluid flow through the gas turbine engine 402, and is coupled to the inner liner 504 to enclose the combustion chamber 506.

Figure 9:
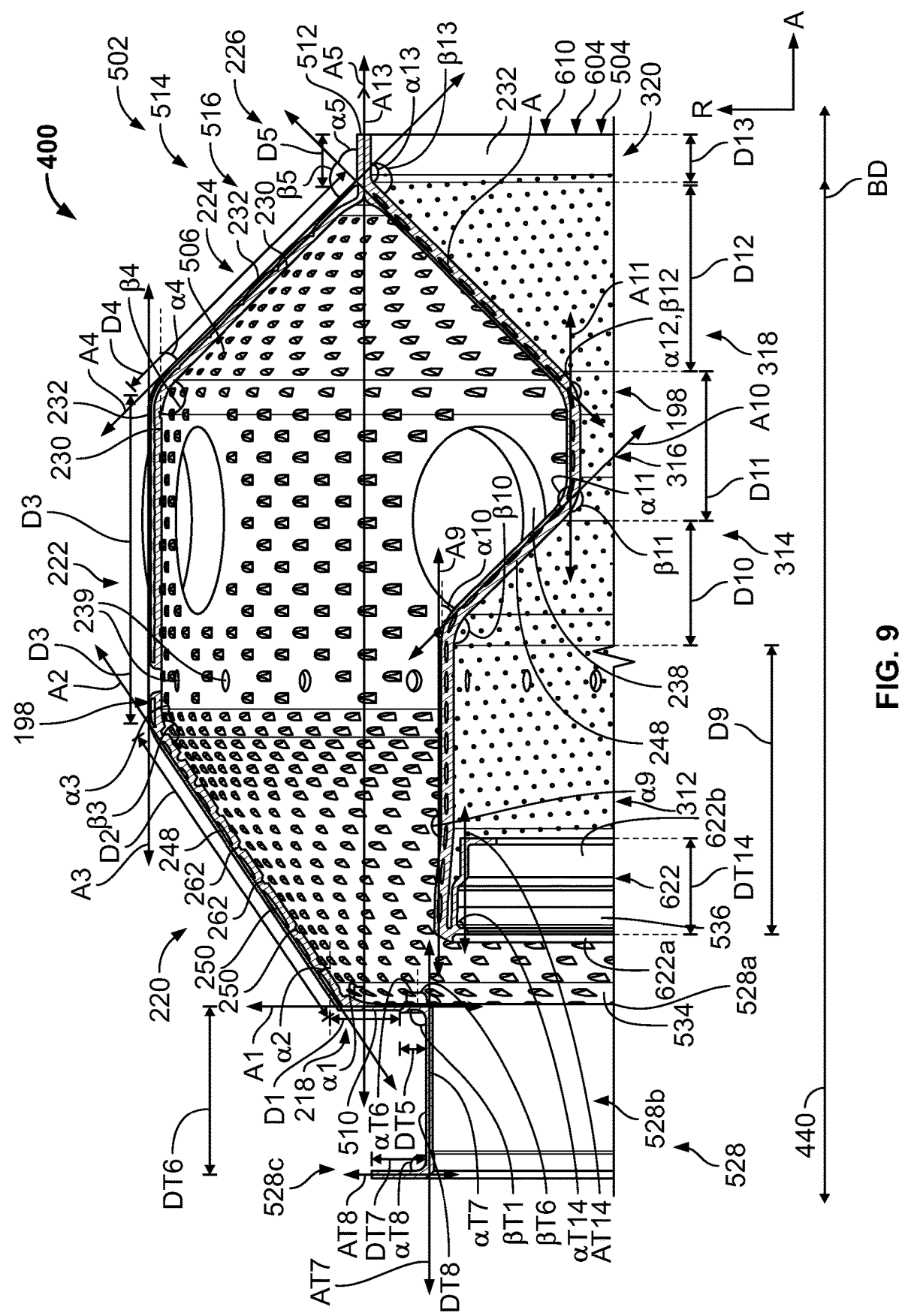
FIG. 9 is a cross-sectional view of the combustor of FIG. 8, taken along line 9-9 of FIG. 8.

With reference to FIG. 9, the outer liner wall 514 is shown in greater detail. In one example, the outer liner wall 514 is composed of a plurality of outer liner wall segments 516, including: the first wall segment 218, the second wall segment 220, the third wall segment 222, the fourth wall segment 224 and the fifth wall segment 226. In one example, a sixth wall segment 528 is connected to the first wall segment 218. Each of the first wall segment 218, the second wall segment 220, the third wall segment 222, the fourth wall segment 224, the fifth wall segment 226 and the sixth wall segment 528 have the double wall, with the inner wall 230 opposite the outer wall 232. The effusion cooling system 198 is defined between the inner wall 230 and the outer wall 232 and provides cooling for the combustor 400.

In addition, each of the first wall segment 218, the second wall segment 220, the third wall segment 222, the fourth wall segment 224, the fifth wall segment 226 and the sixth wall segment 528 are defined so as to extend at an angle of at least 40 degrees relative to the build direction BD of the combustor 400. The build direction BD extends in the axial direction A, and is perpendicular to the radial direction R. In this example, the build direction BD is substantially parallel to and coaxial with the longitudinal axis 440, and is substantially parallel to and coaxial with the centerline C of the combustor 400 (FIG. 8). The first wall segment 218 is defined at the first outer end 510, and extends for the first distance D1. The first wall segment 218 has the first angle $\alpha 1$ relative to the build direction BD. The first wall segment 218 is connected to or integrally formed with the second wall segment 220 and is fixedly coupled to the sixth wall segment 528.

The second wall segment 220 extends for the second distance D2. The second distance D2 cooperates with the first wall segment 218 to define a passageway 534 between the outer liner 502 and the inner liner 504. The passageway 534 directs the combustive gas flow to exit the combustor 400 at an outlet 536 in fluid communication with the turbine section 410. The second wall segment 220 extends at the second angle $\alpha 2$ relative to the build direction BD. The second wall segment 220 also extends at the second angle $\beta 2$ relative to the first wall segment 218.

The third wall segment 222 extends for the third distance D3. The third distance D3 is predetermined to accommodate the fuel injector holes 238 and the quench holes 239. The fuel injector holes 238 are defined through the third wall segment 222 so as to be axially offset toward the fourth wall segment 224. The fuel injector holes 238 are defined so as to be spaced apart about the perimeter or circumference of the combustor 400 (FIG. 8). The third wall segment 222 extends at the third angle $\alpha 3$ relative to the build direction BD. The third wall segment 222 also extends at the third angle $\beta 3$ relative to the second wall segment 220. The fourth wall segment 224 extends for the fourth distance D4. The fourth wall segment 224 extends at the fourth angle $\alpha 4$ relative to the build direction BD. The fourth wall segment 224 also extends at the fourth angle $\beta 4$ relative to the third wall segment 222. The fifth wall segment 226 terminates at the second outer end 512 of the outer liner 502. The fifth wall segment 226 extends for the fifth distance D5. The fifth wall segment 226 extends at the fifth angle $\alpha 5$ relative to the build direction BD. The fifth wall segment 226 also extends at the fifth angle $\beta 5$ relative to the fourth wall segment 224.

The sixth wall segment 528 is connected to the first wall segment 218. In one example, the sixth wall segment 528 is fixedly coupled to the first wall segment 218 via welding. The sixth wall segment 528 extends includes a first sub-segment 528a that is coupled to the first wall segment 218 at the first outer end 510 of the outer liner 502, a second sub-segment 528b that extends axially outward inward from the first outer end 510 of the outer liner 502 and a third sub-segment 528c. The first sub-segment 528a of the sixth wall segment 528 extends for a distance DTS, which is different and less than the first distance D1 and the fifth distance D5. The second sub-segment 528b of the sixth wall segment 528 extends for a seventh distance DT6, which is different and greater than the first distance D1 and the fifth distance D5. The first sub-segment 528a of the sixth wall segment 528 extends at a sixth angle $\alpha T6$ relative to the build direction BD. In this example, the sixth angle $\alpha T6$ is about 90 degrees. The first sub-segment 528a also extends at a sixth angle $\beta T6$ relative to the first wall segment 218. In one example, the sixth angle $\beta T6$ is about 180 degrees.

Figure 7:
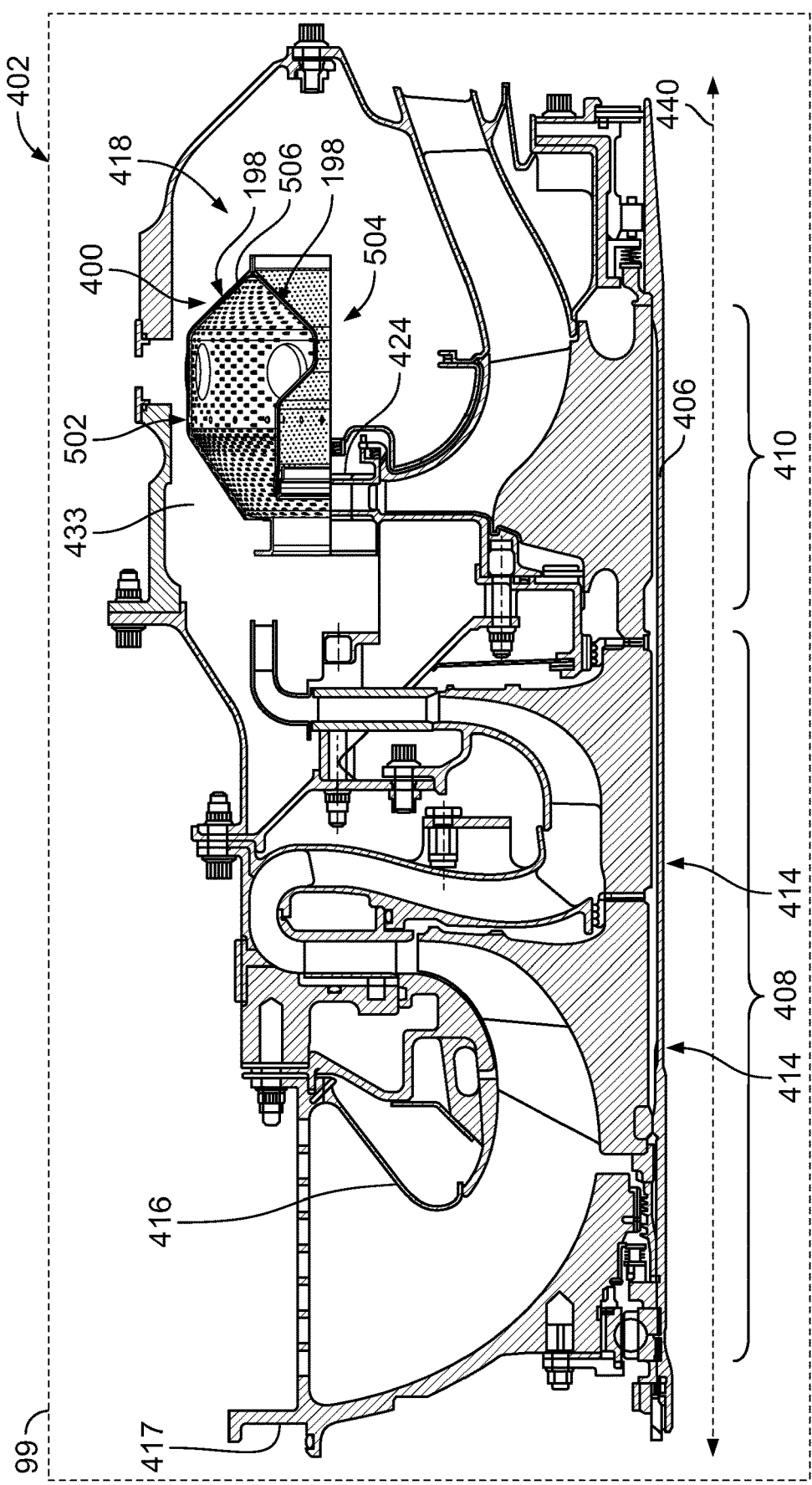
FIG. 7 is a schematic cross-sectional illustration of an engine, such as a gas turbine engine, which includes another exemplary combustor in accordance with the various teachings of the present disclosure.

The second sub-segment 528b of the sixth wall segment 528 extends at a seventh angle $\alpha T7$ relative to the build direction BD. In this example, the seventh angle $\alpha T7$ is about 180 degrees. The second sub-segment 528b of the sixth wall segment 528 also extends at a seventh angle $\beta T7$ relative to the first sub-segment 528a. In one example, the seventh angle $\beta T7$ is about 90 degrees. The second sub-segment 528b of the sixth wall segment 528 cooperates with the inner liner 504 to define the passageway 534 to direct the combustive gas flow to the turbine section 410 (FIG. 7).

The third sub-segment 528c may be connected to or integrally formed with the second sub-segment 528b of the sixth wall segment 528. The third sub-segment 528c cooperates with the inner liner 504 to define the outlet 536. In this example, the third sub-segment 528c extends radially outward for an eighth distance DT8, and overlaps with a portion of the inner liner 504 to define the outlet 536. The eighth distance DT8 is different and less than the second distance D2, the third distance D3, the fourth distance D4 and the seventh distance DT7. The third sub-segment 528c extends at an eighth angle αT8 relative to the build direction BD. In this example, the eighth angle αT8 is about 90 degrees. The third sub-segment 528c also extends at an eighth angle βT8 relative to the second sub-segment 528b of the sixth wall segment 228. In one example, the eighth angle βT8 is about 90 degrees.

Thus, in this example, the outer liner 502 has the first wall segment 218 and the first sub-segment 228a that extends along the first axis A1, which is substantially perpendicular to the longitudinal axis 440. The second wall segment 220 extends along the second axis A2, which is transverse or oblique to the first axis A1 and the longitudinal axis 440. The third wall segment 222 extends along the third axis A3, which is substantially parallel to the longitudinal axis 440 and transverse to the second axis A2. The fourth wall segment 224 extends along the fourth axis A4, which is transverse or oblique to the second axis A2 and the longitudinal axis 440. The fifth wall segment 226 extends along the fifth axis A5, which is substantially parallel to the longitudinal axis 440 and transverse to the fourth axis A4. The first sub-segment 528a of the sixth wall segment 528 extends along a sixth axis AT6, which is which is substantially parallel to the first axis A1 and substantially perpendicular to the longitudinal axis 440. The second sub-segment 528b of the sixth wall segment 528 extends along a seventh axis AT7, which is substantially perpendicular to the first axis A1 and substantially parallel to the longitudinal axis 440. The third sub-segment 528c extends along an eighth axis AT8, which is substantially parallel to the first axis A1 and substantially perpendicular to the longitudinal axis 440. The axes A2 and A4 are each transverse to the build direction BD, and the axes A3 and AT7 are each substantially parallel to the build direction BD. The axes A1, AT6 and AT8 are each substantially perpendicular to the build direction BD.

The outer liner 502 also has the first wall segment 218 that extends at the first angle α1 relative to the build direction BD, which is different and greater than the second angle α2 of the second wall segment 220. The second wall segment 220 also extends at the second angle β2 relative to the first wall segment 218, which is different and less than the third angle β3 defined between the second wall segment 220 and the third wall segment 222. The third wall segment 222 extends at the third angle α3 relative to the build direction BD, which is different and greater than the second angle α2 of the second wall segment 220 and the fourth angle α4 of the fourth wall segment 224. The third wall segment 222 also extends at the fourth angle β4 relative to the fourth wall segment 224, which is different and less than the fifth angle β5 defined between the fourth wall segment 224 and the fifth wall segment 226. The fourth wall segment 224 extends at the fourth angle α4 relative to the build direction BD, which is different and less than the fifth angle α5 of the fifth wall segment 226.

Figure 10:
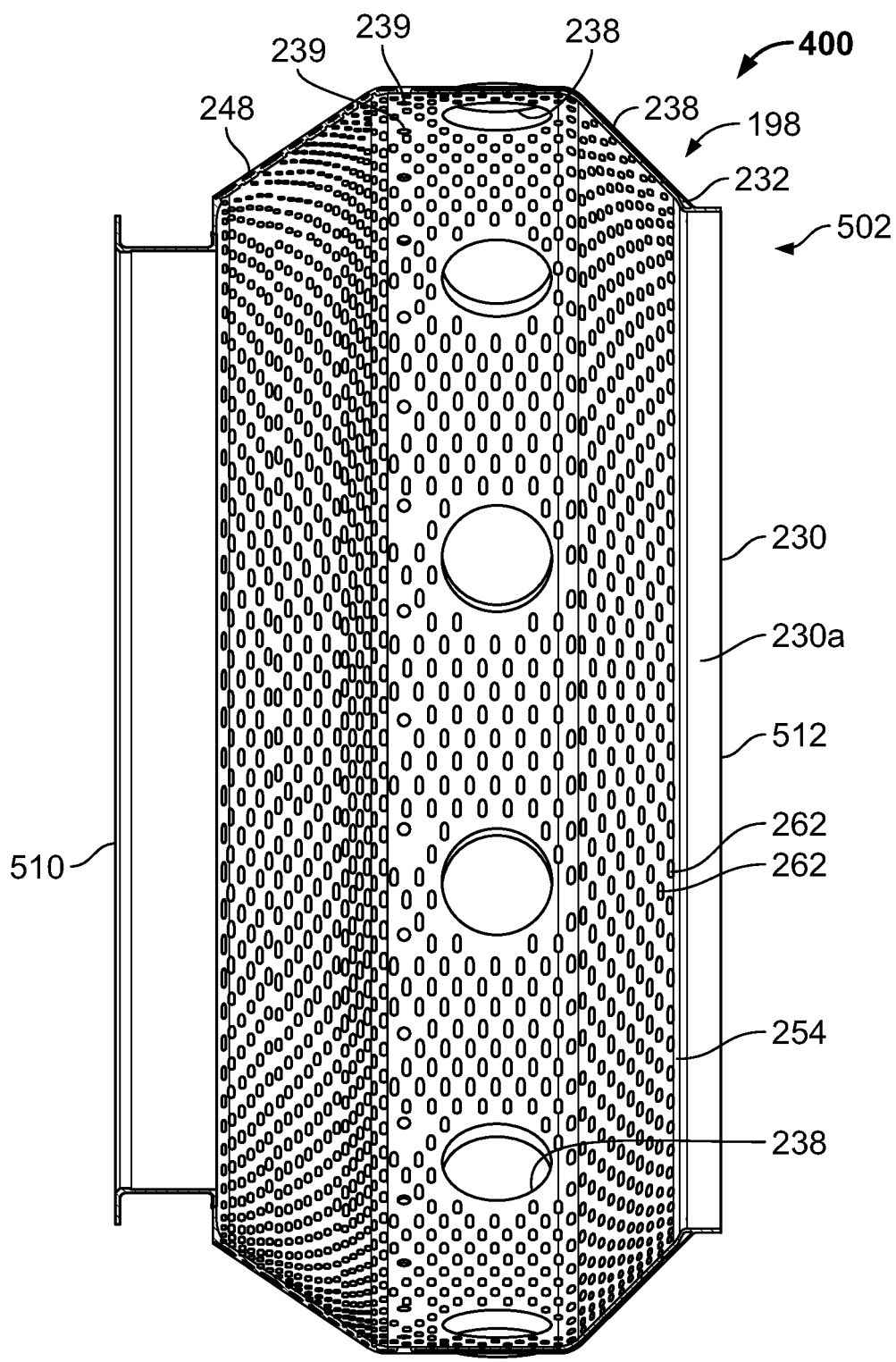
FIG. 10 is a cross-sectional view of an inner wall surface of the outer liner, taken along line 9-9 of FIG. 8.

As discussed, each of the wall segments 218, 220, 222, 224, 226, 528a, 528b and 528c associated with the outer liner wall 514 have the double wall, with the inner wall 230 opposite the outer wall 232 that defines the intervening cavity 248 between the inner wall 230 and the outer wall 232. In this example, the double wall including the effusion cooling system 198 is the same between the outer liner 502 and the inner liner 504 of the combustor 400, and is the same between the outer liner 202 and the inner liner 204 of the combustor 200. Thus, the double wall and the effusion cooling system 198 associated with the outer liner 502 and the inner liner 504 will not be discussed in detail herein. Briefly, with reference to FIG. 10, the inner wall surface 230a of the outer liner 502 is shown. The inner wall 230 is opposite the outer wall 232 defines the intervening cavity 248 between the inner wall 230 and the outer wall 232. The effusion cooling system 198 is defined between the inner wall 230 and the outer wall 232 of each of wall segments 218, 220, 222, 224, 226, 528a, 528b. With reference back to FIG. 9, the effusion cooling system 198 includes the plurality of pedestals 250, the plurality of impingement cooling holes 252 and the plurality of effusion cooling passages 254.

With reference back to FIG. 8, the inner liner 504 includes a first inner end 600, a second inner end 602 opposite the first inner end 600, and an inner liner wall 604. The first inner end 600 is fluidly coupled to the turbine section 410 to direct the combustive gas flow from the combustor 400 to the turbine section 410 (FIG. 7). The second inner end 602 is upstream from the first inner end 600 in a direction of working fluid flow through the gas turbine engine 402, and is coupled to the outer liner 502 to enclose the combustion chamber 506.

With reference to FIG. 9, the inner liner wall 604 is shown in greater detail. In one example, the inner liner wall 604 is composed of a plurality of inner liner wall segments 610, including: the first inner wall segment 312, the second inner wall segment 314, the third inner wall segment 316, the fourth inner wall segment 318, the fifth inner wall segment 320 and a sixth inner wall segment 622. Each of the first inner wall segment 312, the second inner wall segment 314, the third inner wall segment 316, the fourth inner wall segment 318, the fifth inner wall segment 320 and the sixth inner wall segment 322 have the double wall, with the inner wall 230 opposite the outer wall 232. It should be noted that the inner wall surface 230a of the inner liner 504 is the same as the inner wall surface 230a of the inner liner 204 shown in FIG. 6, and as discussed, the double wall and the effusion cooling system 198 associated with the inner liner 504 will not be discussed in detail herein. Briefly, the inner wall 230 opposite the outer wall 232 defines the intervening cavity 248 between the inner wall 230 and the outer wall 232. The effusion cooling system 198 is defined between the inner wall 230 and the outer wall 232 of each of the first inner wall segment 312, the second inner wall segment 314, the third inner wall segment 316, the fourth inner wall segment 318, the fifth inner wall segment 320 and a sixth inner wall segment 622.

In addition, each of the first inner wall segment 312, the second inner wall segment 314, the third inner wall segment 316, the fourth inner wall segment 318, the fifth inner wall segment 320 and the sixth inner wall segment 622 are defined so as to extend at an angle of at least 40 degrees relative to the build direction BD of the combustor 200. The first inner wall segment 312 is defined at the first inner end 600, and extends for the ninth distance D9. The ninth distance D9 is predetermined such that the first inner wall segment 312 is spaced a distance apart from the first sub-segment 228a of the sixth wall segment 228 of the outer liner 502 to form the passageway 534. The first inner wall segment 312 extends along the ninth distance D9 so as to be opposite a portion of the second wall segment 220 and the third wall segment 222. The first inner wall segment 312 has the ninth angle α9 relative to the build direction BD. The first inner wall segment 312 is connected to or integrally formed with the second inner wall segment 314 and the sixth inner wall segment 622. The first inner wall segment 312 includes the one or more quench holes 239.

The second inner wall segment 314 extends for the tenth distance D10. The second wall segment 220 extends at the tenth angle α10 relative to the build direction BD. The second inner wall segment 314 also extends at the tenth angle β10 relative to the first inner wall segment 312. The third inner wall segment 316 extends for the eleventh distance D11. The eleventh distance D11 cooperates with the tenth distance D10 such that the second inner wall segment 314 and the third inner wall segment 316 are substantially opposite the fuel injector holes 238. The third inner wall segment 316 extends at the eleventh angle α11 relative to the build direction BD. The third inner wall segment 316 also extends at the eleventh angle β11 relative to the second inner wall segment 314.

The fourth inner wall segment 318 extends for the twelfth distance D12. The fourth inner wall segment 318 is substantially opposite the fourth wall segment 224 of the outer liner 502. The fourth inner wall segment 318 extends at the twelfth angle α12 relative to the build direction BD. The fourth wall segment 224 also extends at the twelfth angle β12 relative to the third inner wall segment 316. The fifth inner wall segment 320 extends for the thirteenth distance D13. The fifth inner wall segment 320 extends at the thirteenth angle α13 relative to the build direction BD. In this example, the thirteenth angle α13 is about 180 degrees. The fifth inner wall segment 320 also extends at the thirteenth angle β13 relative to the fourth inner wall segment 318. The fifth inner wall segment 320 extends for about the same length as the fifth wall segment 226 of the outer liner 502 to facilitate coupling or joining the inner liner 504 to the outer liner 502 at the respective second ends 602, 512.

The sixth inner wall segment 622 is connected to or integrally formed with the first inner wall segment 312 and extends axially inward at the first inner end 600 of the inner liner 504. The sixth inner wall segment 622 extends for a fourteenth distance DT14, which is different and less than the distances D8-D12. The sixth inner wall segment 322 extends at a fourteenth angle αT14 relative to the build direction BD. In this example, the fourteenth angle αT14 is about 180 degrees. In one example the sixth inner wall segment 622 is integrally formed with the first inner wall segment 312 such that the sixth inner wall segment 622 is substantially parallel to the first inner wall segment 312. The sixth inner wall segment 622 includes two radially inward extending flanges 622a, 622b, which assist in coupling the combustor 400 within the gas turbine engine 402.

Thus, in this example, the inner liner 504 has the first inner wall segment 312 that extends along the ninth axis A9, which is substantially parallel to the longitudinal axis 440. The second inner wall segment 314 extends along the tenth axis A10, which is transverse or oblique to the ninth axis A9 and the longitudinal axis 440. The third inner wall segment 316 extends along the eleventh axis A11, which is substantially parallel to the longitudinal axis 440 and transverse to the tenth axis A10. The fourth inner wall segment 318 extends along the twelfth axis A12, which is transverse or oblique to the eleventh axis A11 and the longitudinal axis 440. The fifth inner wall segment 320 extends along the thirteenth axis A13, which is substantially parallel to the longitudinal axis 440 and transverse to the eleventh axis A11. The sixth inner wall segment 622 extends along a fourteenth axis AT14, which is substantially parallel to the ninth axis A9 and the longitudinal axis 440. The axes A10 and A12 are each transverse to the build direction BD, and the axes A9, AT14 and A13 are each substantially parallel to the build direction BD.

The inner liner 504 also has the first inner wall segment 312 that extends at the ninth angle α9 relative to the build direction BD, which is different and greater than the tenth angle α10 of the second inner wall segment 314. The second inner wall segment 314 also extends at the tenth angle β10 relative to the first inner wall segment 312, which is different and greater than the eleventh angle β11 defined between the second inner wall segment 314 and the third inner wall segment 316. The third inner wall segment 316 extends at the eleventh angle α11 relative to the build direction BD, which is different and greater than the tenth angle α10 of the second inner wall segment 314 and the twelfth angle α12 of the fourth inner wall segment 318. The third inner wall segment 316 also extends at the twelfth angle β12 relative to the fourth inner wall segment 318, which is different and less than the thirteenth angle β13 defined between the fourth inner wall segment 318 and the fifth inner wall segment 320. The fourth inner wall segment 318 extends at the twelfth angle α12 relative to the build direction BD, which is different and less than the thirteenth angle α13 of the fifth inner wall segment 320.

Figure 11:
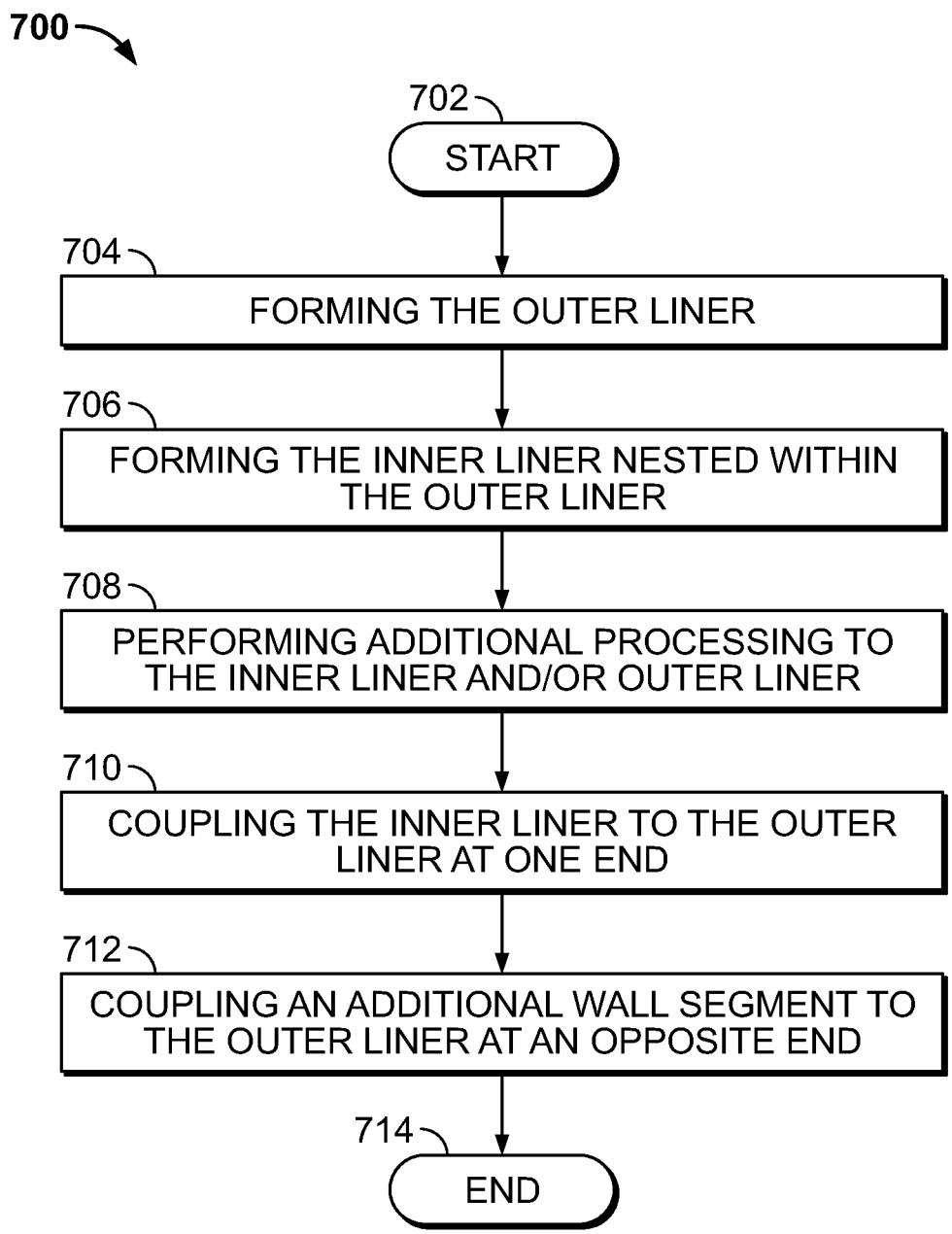
FIG. 11 is a flowchart illustrating an exemplary method of manufacturing the combustors of FIGS. 1-10 in accordance with the various teachings of the present disclosure.

With reference to FIG. 11, a flowchart illustrates an exemplary method 700 for manufacturing the combustor 200, 400. In one example, the method begins at 702. At 704, the method proceeds with forming the outer liner 202, 502, and at 706, the method proceeds with forming the inner liner 204, 504 nested within the outer liner 202, 502. While identified as different blocks 704, 706, the method forms the inner liner 204, 504 substantially concurrently with the forming of the outer liner 202, 502 in a single build. Generally, the inner liner 204, 504 is formed substantially concurrently with the forming of the respective outer liner 202, 502 so as to be nested within the outer liner wall 214, 514 of the outer liner 202, 502. The inner liner 204, 504 and the respective outer liner 202, 502 are composed of a metal or metal alloy, including, but not limited to Haynes® 282 alloy, Inconel 625 and Hastelloy®-X. In this example, the inner liner 204, 504 and the respective outer liner 202, 502 are formed in a single build using additive manufacturing, including, but not limited to direct metal laser sintering (DMLS), laser powder bed fusion (L-PBF), electron powder bed fusion (E-PBF) or electron beam melting (EBM). The inner liner 204, 504 and the outer liner 202, 502 are each formed through additive manufacturing to include the outer liner wall 214, 514 and the inner liner wall 304, 604, respectively, with the double wall that includes the effusion cooling system 198.

With the inner liner 204, 504 formed so as to be nested within the outer liner wall 214, 514 of the respective outer liner 202, 502, at 708, the inner liner 204, 504 may be removed from the outer liner 202, 502 and one or both of the inner liner 204, 504 and the outer liner 202, 502 may be subjected to additional processing. For example, one or both of the inner liner 204, 504 and the respective outer liner 202, 502 may be subjected to stress relief, heat treatment, hot isostatic pressing (HIP), the application of one or more coatings, such as a thermal barrier coating as described in commonly assigned U.S. Pat. No. 10,895,157, previously incorporated herein by reference, and the like. Once the additional processing is completed, at 710, the inner liner 204, 504 is coupled to the respective outer liner 202, 502 at the second ends 212, 512 to enclose the combustion chamber 206, 506. In one example, the second ends 212, 512 are coupled together via welding. At 712, an additional wall segment, such as the sixth wall segment 228, 528 is coupled to the first wall segment 218 of the respective outer liner 202, 502 via welding, for example. Generally, the sixth wall segment 228, 528 is composed of a metal or metal alloy, including, but not limited to Haynes® 282 alloy, Inconel 625 and Hastelloy®-X. The sixth wall segment 228, 528 is formed using additive manufacturing including, but not limited to direct metal laser sintering (DMLS), laser powder bed fusion (L-PBF), electron powder bed fusion (E-PBF) or electron beam melting (EBM). The sixth wall segment 228, 528 is described herein as being separately formed and coupled to the first wall segment 218, however, in other examples, the sixth wall segment 228, 528 may be integrally formed with the first wall segment 218 if desired. At 714, the manufacture of the combustor 200, 400 is complete, and the combustor 200, 400 may be installed in the respective gas turbine engine 100, 402.

Once installed in the respective gas turbine engine 100, 402, generally, during operation of the respective gas turbine engine 100, 402, pressurized air from the compressor section 130, 430 is intermixed with fuel introduced through the fuel injectors and ignited by an igniter (not shown) to support initial combustion within the respective combustor 200, 400. Additional air for further combustion flows from the plenum 133, 433 into the combustion chamber 206, 506 through the quench holes 239. Air from the plenum 133, 433 also enters the impingement cooling holes 252, and flows through the effusion cooling passages 254 to generate a film of cooling fluid along the hot walls or inner wall surfaces 230a of the inner liner 204, 504 and the respective outer liner 202, 502.

Thus, the structure of the combustor 200, 400 enables the combustor 200, 400 to be additively manufactured with the inner liner 204, 504 formed substantially concurrently with the forming of the outer liner 202, 502. By forming the inner liner 204, 504 nested within the outer liner 202, 502 substantially concurrently, a single additive manufacturing process may be performed to produce a substantial majority of the combustor 200, 400, which reduces cost and manufacturing time. In addition, by additively manufacturing the combustor 200, 400, the effusion cooling system 198 (FIG. 4) may be defined in the double wall of both of the inner liner 204, 504 and the respective outer liner 202, 502, which improves cooling of the combustor 200, 400 and thereby increases a life of the combustor 200, 400 while reducing maintenance costs. The improved cooling of the combustor 200, 400 also enables the combustor 200, 400 to be used in higher temperature or high performance applications. In addition, the shape of the combustor 200, 400 enables the combustor 200, 400 to be additively manufactured without requiring supports or to be self-supporting during additive manufacturing. The shape or structure of the combustor 200, 400 also provides reduced parts and reduced leakage, as by additively manufacturing the inner liner 204, 504 and the outer liner 202, 502 to be one-piece or monolithic, additional parts and seals are not needed. In addition, the one-piece or monolithic inner liner 204, 504 and outer liner 202, 502 reduces a weight associated with the combustor 200, 400. The sixth wall segments 228, 528 also provide an improved interface for the turbine nozzle associated with the turbine section 150, 410.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A combustor for a gas turbine engine, comprising:
   an outer liner having a first end and a second end opposite the first end, the first end interconnected to the second end by an outer liner wall composed of a plurality of outer wall segments; and
   an inner liner having a first inner end and a second inner end opposite the first inner end, the second inner end coupled to the second end of the outer liner, the first inner end interconnected to the second inner end by an inner liner wall composed of a plurality of inner wall segments,
   wherein the outer liner wall and the inner liner wall cooperate with each other to define a combustion chamber, and each of the plurality of outer wall segments extend at an angle of at least 40 degrees relative to a longitudinal axis of the combustor and the plurality of outer wall segments includes a first straight wall segment, a second straight wall segment that extends at a second angle relative to the first straight wall segment, which is less than a third angle defined between the second straight wall segment and a third straight wall segment of the plurality of outer wall segments and is substantially the same as a fourth angle defined between the third straight wall segment and a fourth straight wall segment of the plurality of outer wall segments, and each of the second angle and the fourth angle is an acute angle.

2. The combustor of claim 1, wherein the first straight wall segment of the plurality of outer wall segments is at the first end of the outer liner.

3. The combustor of claim 1, wherein at least one of the outer liner wall and the inner liner wall has a double wall, with an effusion cooling system defined between the double wall.

4. The combustor of claim 1, wherein the fourth angle is different than a fifth angle defined between the fourth straight wall segment and a fifth straight wall segment of the plurality of outer wall segments.

5. The combustor of claim 4, wherein the first straight wall segment, the second straight wall segment, the third straight wall segment, the fourth straight wall segment and the fifth straight wall segment are each integrally formed.

6. The combustor of claim 5, further comprising a sixth straight wall segment, and the sixth straight wall segment cooperates with the inner liner to define a passageway to an outlet of the combustor.

7. The combustor of claim 1, wherein each of the plurality of inner wall segments extends at an angle of at least 40 degrees relative to the longitudinal axis.

8. The combustor of claim 7, wherein the plurality of inner wall segments includes a first straight inner wall segment and a second straight inner wall segment, and the second straight inner wall segment extends at a tenth angle relative to the first straight inner wall segment, and the tenth angle is an acute angle.

9. The combustor of claim 8, wherein the plurality of inner wall segments includes a third straight inner wall segment that extends at an eleventh angle relative to the second straight inner wall segment, and the eleventh angle is different than the tenth angle.

10. The combustor of claim 9, wherein the plurality of inner wall segments includes a fourth straight inner wall segment that extends at a twelfth angle relative to the third straight inner wall segment, and the twelfth angle is different than the tenth angle.

11. The combustor of claim 10, wherein the plurality of inner wall segments includes a fifth straight inner wall segment that extends at a thirteenth angle relative to the third straight inner wall segment, and the thirteenth angle is different than the twelfth angle.

12. The combustor of claim 1, wherein the third straight wall segment defines at least one fuel injector hole.

13. A method of manufacturing a combustor for a gas turbine engine, comprising:
   forming an outer liner having a first end, a second end opposite the first end and an outer liner wall interconnecting the first end and the second end, the outer liner wall including a plurality of outer wall segments that each extend at an angle of at least 40 degrees relative to a longitudinal axis of the combustor, the plurality of outer wall segments including a first straight wall segment, a second straight wall segment that extends at a second angle relative to the first straight wall segment, which is less than a third angle defined between the second straight wall segment and a third straight wall segment of the plurality of outer wall segments and is substantially the same as a fourth angle defined between the third straight wall segment and a fourth straight wall segment of the plurality of outer wall segments, and each of the second angle and the fourth angle is an acute angle;
   substantially concurrently with the forming of the outer liner, forming an inner liner nested within the outer liner wall, the inner liner having a first inner end and a second inner end opposite the first inner end, the first inner end interconnected to the second inner end by an inner liner wall composed of a plurality of inner wall segments; and
   coupling the second inner end of the inner liner to the second end of the outer liner to define a combustion chamber.

14. The method of claim 13, wherein the forming of the outer liner and the forming of the inner liner further comprise additively manufacturing the outer liner and the inner liner and the longitudinal axis of the combustor is coaxial with a build direction of the combustor during the additive manufacturing.

15. The method of claim 13, wherein the forming of the inner liner further comprises the plurality of inner wall segments to each extend at an angle of at least 40 degrees relative to the longitudinal axis of the combustor.

16. The method of claim 13, wherein the coupling the second inner end of the inner liner to the second end of the outer liner further comprises welding the second inner end of the inner liner to the second end of the outer liner.

17. The method of claim 13, wherein the forming the outer liner further comprises forming the outer liner with a double wall and an effusion cooling system defined within the double wall.

18. The method of claim 13, further comprising forming an additional wall segment and coupling the additional wall segment to the first straight wall segment of the outer liner.

19. A combustor for a gas turbine engine, comprising:
   an outer liner having a first end and a second end opposite the first end, the first end interconnected to the second end by an outer liner wall composed of a plurality of outer wall segments; and
   an inner liner having a first inner end and a second inner end opposite the first inner end, the second inner end coupled to the second end of the outer liner, the first inner end interconnected to the second inner end by an inner liner wall composed of a plurality of inner wall segments,
   wherein the outer liner wall and the inner liner wall cooperate with each other to define a combustion chamber, and each of the plurality of outer wall segments and the plurality of inner wall segments extends at an angle of at least 40 degrees relative to a longitudinal axis of the combustor and the plurality of outer wall segments includes a first straight wall segment that extends along a first axis that is substantially perpendicular to the longitudinal axis, a second straight wall segment that extends along a second axis that is transverse to the first axis and to the longitudinal axis, a third straight wall segment that extends along a third axis that is substantially parallel to the longitudinal axis and transverse to the second axis, and a fourth straight wall segment, the second straight wall segment extends at a second angle relative to the first straight wall segment, the third straight wall segment extends at a third angle relative to the second straight wall segment, the second angle is an acute angle and the second angle is substantially the same as a fourth angle defined between the third straight wall segment and the fourth straight wall segment.

20. The combustor of claim 19, wherein the fourth straight wall segment extends along a fourth axis that is transverse to the third axis and the longitudinal axis, a fifth straight wall segment extends along a fifth axis that is transverse to the fourth axis and substantially parallel to the longitudinal axis, and the fourth angle is an acute angle.

* * * * *